United States Patent [19]

Anger et al.

[11] Patent Number: 5,170,438
[45] Date of Patent: Dec. 8, 1992

[54] METHOD AND APPARATUS FOR DETERMINING THE FLOW RATE OF A VISCOUS FLUID STREAM

[75] Inventors: Steven J. Anger, Hamilton; William J. Devonshire, Orton, both of Canada

[73] Assignee: Graham Fiber Glass Limited, Erin, Canada

[21] Appl. No.: 673,531

[22] Filed: Mar. 22, 1991

[51] Int. Cl.⁵ .............................................. G06K 9/00
[52] U.S. Cl. ....................................... 382/1; 73/861.05
[58] Field of Search ........................... 382/1; 364/473; 73/863.02, 863.03, 861.05; 250/356.1; 358/107; 65/2, 9

[56] References Cited

U.S. PATENT DOCUMENTS

| | | | |
|---|---|---|---|
| 3,592,057 | 7/1971 | Farum | 73/861.05 |
| 3,739,636 | 6/1973 | Versaci et al. | 74/194 E |
| 3,818,231 | 6/1974 | Gopal et al. | 250/356 |
| 4,090,241 | 5/1978 | Houston | 364/473 |
| 4,205,230 | 5/1980 | Stubbs | 250/356 |
| 4,205,973 | 6/1980 | Ryan | 65/29 |
| 4,297,893 | 11/1981 | Weinstein | 73/861 |
| 4,331,132 | 5/1982 | Mikasa | 128/6 |
| 4,517,845 | 5/1985 | Ransheim et al. | 73/861.05 |
| 4,543,834 | 10/1985 | Hasegawa | 73/861.05 |
| 4,554,832 | 11/1985 | Hasegawa | 73/432 |
| 4,671,297 | 6/1987 | Schulze | |
| 4,737,178 | 4/1988 | Reifschneider et al. | 65/2 |
| 4,775,400 | 10/1988 | Wright et al. | 65/2 |
| 4,837,708 | 6/1989 | Wright | 364/509 |
| 4,866,639 | 9/1989 | Adrian | 364/525 |
| 4,877,436 | 10/1989 | Sheinkop | 65/29 |
| 4,925,296 | 5/1990 | Reichmuth | 356/28 |

FOREIGN PATENT DOCUMENTS

17201/88 12/1988 Australia .
56-147013 11/1981 Japan .
2083612 3/1982 United Kingdom .

Primary Examiner—David K. Moore
Assistant Examiner—Yon Jung
Attorney, Agent, or Firm—Beveridge, DeGrandi & Weilacher

[57] ABSTRACT

A method of determining the flow rate of a viscous fluid stream comprises passing the fluid stream through a field of view of an electronic imaging device, which produces output signals representing images of the fluid stream at successive times $t_0, t_1, \ldots t_n$. Signals representing an image of the fluid stream at a first time $t_i$ are stored in a first memory, while signals representing an image of the fluid stream at a second time $t_j$, are stored in a second memory. The time $t_j - t_i$ is less than the time taken for a point on the fluid stream to cross the field of view of the imaging device. The stored signals are then analyzed to derive width signals $W(y)$ representing the width of the fluid stream as a function of y, where y represents a coordinate in the direction of fluid flow, and the first and second stored signals are compared to identify a common point on the fluid stream in the respective images represented thereby. A signal representing the flow rate of the fluid stream is derived from the width signals $W(y)$ and signals representing at least the y coordinates $y_1, y_2$ of the common point in the respective images. This method permits the continual monitoring of the volumetric flow rate while taking into account fluctuations in the width of the stream.

17 Claims, 9 Drawing Sheets

METHOD AND APPARATUS FOR DETERMINING THE FLOW RATE OF A VISCOUS FLUID STREAM

BACKGROUND OF THE INVENTION

1. Field of the Invention

This invention relates to an apparatus for determining the volumetric flow rate of a viscous fluid stream, such as a molten glass stream.

2. Description of the Prior Art

In the manufacture of glass fiber, it is important to know accurately the volumetric flow rate, known as the pull rate, of the molten glass emerging from the heated forming bushing. The pull rate must be varied by continually adjusting the heat input to the forming bushing to maintain the characteristics desired in the finished fiber.

An apparatus is known for determining the flow rate of a molten glass stream by detecting bubbles naturally present in the stream and measuring the time taken for a bubble to flow between two predetermined points. Such apparatus is disclosed, for example, in U.S. Pat. No. 4,517,845 to Gullfiber. This apparatus employs a pair of spaced photodetectors which generate pulses as a bubble passes, and which after suitable shaping can be used to measure the time between the passage of the bubbles past the respective detectors. From the flow velocity thus measured, the volumetric flow rate can be determined by measuring the width of the fluid stream with the aid of a linear array of photodiodes.

While the apparatus described is capable of making a rough approximation of the volumetric flow rate, it suffers from inaccuracies due to the fact that in reality the width of the fluid stream varies as it flows between the photodetectors, leading to inaccuracies in the calculated volumetric rate.

Various other systems for measuring flow rate are known and are described, for example, in the following patents:

U.S. Pat. No. 4,877,436, I. Sheinkop, discloses an arrangement where an auxiliary falling stream of molten glass passes through a laser beam and the diameter of the stream is measured along with the time taken for air bubbles or 'seeds' to pass through the beam. This patent depends on the detection of specular reflection from bubbles passing through a laser beam. As it requires lots of seeds, it is not suitable for highly refined glass.

U.S. Pat. No. 4,205,973, W. H. Ryan (Owens-Illinois Inc.), discloses an arrangement whereby the rate of fall, volume and section of a gob of glass are measured by two vertically spaced photodetectors and a pair of cameras arranged at 90 degrees in a horizontal plane. This arrangement suffers from the same disadvantage as Gullfiber mentioned above.

U.S. Pat. No. 3,739,636, (AA Versaci), discloses means for injecting a bubble into a fluid conduit, measuring the time taken to pass between two optical detectors and computing the flow rate. The arrangement suffers from the same disadvantage as Gullfiber.

A number of other arrangements for measuring fluid flow rate are disclosed in U.S. Pat. No. 4,866,639, R. J. Adrian (University of Illinois); U.S. Pat. No. 4,737,178, L. G. Relfschneider et al., (Owens-Corning Fiberglas Corp.); U.S. Pat. No. 4,837,708, T. B. Wright; U.S. Pat. No. 4,331,132, S. Mukasa (Olympus Optical Co., Ltd.); U.S. Pat. No. 4,554.832 - T. Hasegawa et al. (Nippon Furnace KK Ltd.); U.S. Pat. No. 4,925,296, J. Reichmuth; GB 2083612, P. H. Casswell; DE 1934583, C. T. Boe et al. (Instituttet fur Porduktudvickling Danmarks Tekniske Hojskole); JP56-147013A, H. Mukal (Klyouto Denshi KK); JP 55-040918A, K. Yamaguchi et al, (Niksuklsou KK).

An object of the present invention is to alleviate the disadvantages of the aforementioned prior art and provide a method and apparatus capable of more accurately providing the volumetric flow rate of a stream of viscous fluid, more particularly a stream of molten glass.

SUMMARY OF THE INVENTION

According to a first aspect of the present invention there is provided a method of determining the flow rate of a viscous fluid stream, comprising passing the fluid stream through a field of view of an electronic imaging means, said imaging means producing output signals representing images of said fluid stream at successive times $t_0, t_1, \ldots t_n$, storing in first memory means signals representing an image of said fluid stream at a first time $t_i$, storing in second memory means signals representing an image of said fluid stream at a second time $t_j$, where $t_j - t_i$ is less than the time taken for a point on said fluid stream to cross the field of view of said imaging means, analyzing said stored signals to derive width signals $W(y)$ representing the width of said fluid stream as a function of y, where y represents a coordinate in the direction of fluid flow, comparing said first and second stored signals to identify a common point on said fluid stream in the respective images represented thereby, deriving signals representing at least the y coordinates $y_1, y_2$ of said common point in the respective images, and deriving a signal representing the flow rate of said fluid stream from said width signals $W(y)$ and said signals representing at least the y coordinates $y_1, y_2$ of said common point in the respective images.

In a preferred embodiment the output signals produced by the camera are digitized and stored at discrete addresses in the first memory means. The digitized signal at each address represents the intensity at a corresponding pixel in the image.

In order to determine the width of the fluid stream as a function of y, the images are first scanned line by line to identify the edges of the fluid stream. These are defined by changes in intensity exceeding a predetermined threshold relative to background intensity.

The stored images are then scanned to identify groups of adjacent pixels having values above a previously determined threshold. These groups are assumed to represent bubbles in the fluid stream. Once identified, the pixels of each group are set to a predetermined value, preferably 255, which designates them as parts of the bubbles.

The digitized signals are then compared to match the bubbles identified in the stored images. The bubbles are matched by determining the X and Y coordinates of all bubbles in the images. Since the lateral movement of bubbles in a fluid stream is very limited, bubble paths for which the difference in X coordinates exceeds a predetermined value, preferably 10 pixels, can be eliminated. Similarly, the distance travelled by the bubbles in the Y or longitudinal direction is limited by the limits on the changes in fluid stream velocity. For electronic scanning at 60 fields per second, the difference in the Y coordinates must lie in the range 320 and 380 pixels for a given lens magnification and image height of 512 pixels From the fluid stream width and velocity, the mess flow rate can be determined from the following expression:

$$\text{Flow} = \frac{K \cdot G_{dens}}{(T_2 - T_1)} \sum_{y=y^1}^{y^2} \frac{\Pi}{4} (\text{Width}(y))^2 \quad (1)$$

where, $G_{dens}$ = density of glass
$T_2 - T_1$ = Time interval between frames
$y^1$ = Y coordinate of bubble at time $T_1$
$y^2$ = Y coordinate of bubble at time $T_2$
Width (y) = Stream width as a function of Y coordinate.
K = Calibration constant.

The processing means is preferably in the form of a microprocessor with associated memory devices.

In another aspect, the invention provides an apparatus for determining the flow rate of a viscous fluid stream comprising an electronic imaging means having a field of view through which the fluid stream passes, said imaging means producing output signals representing images of said fluid stream at successive time intervals $t_o, t_l, \ldots t_n$, first memory means for storing signals representing an image of said fluid stream at a first time $t_i$, second memory means for storing signals representing an image of said fluid stream at a second time $t_j$, time $t_j - t_i$ being less than the time taken for a point on said fluid stream to cross the field of view of said electronic imaging means, means for analyzing said stored signals to identify the edges of said fluid stream and derive signals W(y) representing the width thereof as a function of y, where y represents a coordinate in the direction of fluid flow, means for analyzing said stored signals to identify a common point on said fluid stream in said respective images and derive signals representing at least the y coordinates $y_1, y_2$ of said common point in the respective images, and processing means for deriving a signal representing the volumetric flow rate of said fluid stream from said width signals W(y) and said signals representing at least the y coordinates $y_1, y_2$ of said common point in the respective images.

The imaging means is preferably in the form of a CCD (charge-coupled device video camera). The camera is not restricted to operating in the visible region, and may, for example operate at infra-red or ultra-violet wavelengths.

BRIEF DESCRIPTION OF THE DRAWINGS

The invention will now be described in more detail, by way of example only, with reference to the accompanying drawings, in which.

DESCRIPTION OF PREFERRED EMBODIMENTS

Figure 1:
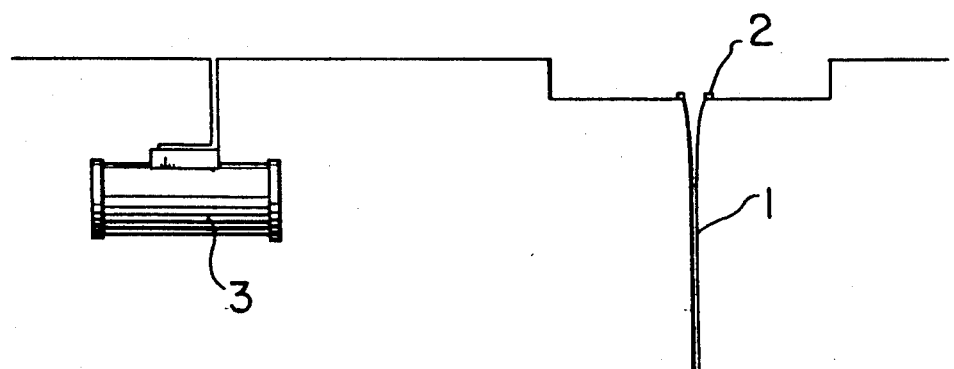
FIG. 1 is a diagram illustrating the relationship between the camera and the molten glass stream.

In FIG. 1, a molten glass stream 1, which is to be drawn into a filament, flows out of a controlled forming bushing 2. The forming bushing is heated, and by varying the amount of energy applied, the viscosity of the glass flowing through it can be changed, thereby varying the characteristics of the glass flowing out of the bushing to determine the properties of the glass filament 1.

The glass stream 1 flows across the field of view of a video camera 3, which is conveniently a CCD (charge coupled device) camera with an electronic shutter. The CCD camera consists of an array of light sensitive cells that store a charge dependent on the intensity of light falling on them. The cells are sequentially accessed to provide an output signal that is a line by line scan of the image formed in the camera.

In accordance with standard video technology, the image is scanned at a rate of 30 frames per second, each frame being divided into two fields, the first field consisting of the even numbered lines and the second field consisting of the odd numbered lines, consequently 60 fields per second.

In a conventional video camera, the electronic shutter is programmed to operate once per frame. Each image is made up of the two interleaved fields. Consequently, although there are only 30 images per second, the actual flicker rate is 60 fields per second, and this creates the impression of continuous movement. In this apparatus, the camera's shutter is programmed to operate once per field, so that each interleaved field contains a different image.

Figure 2:
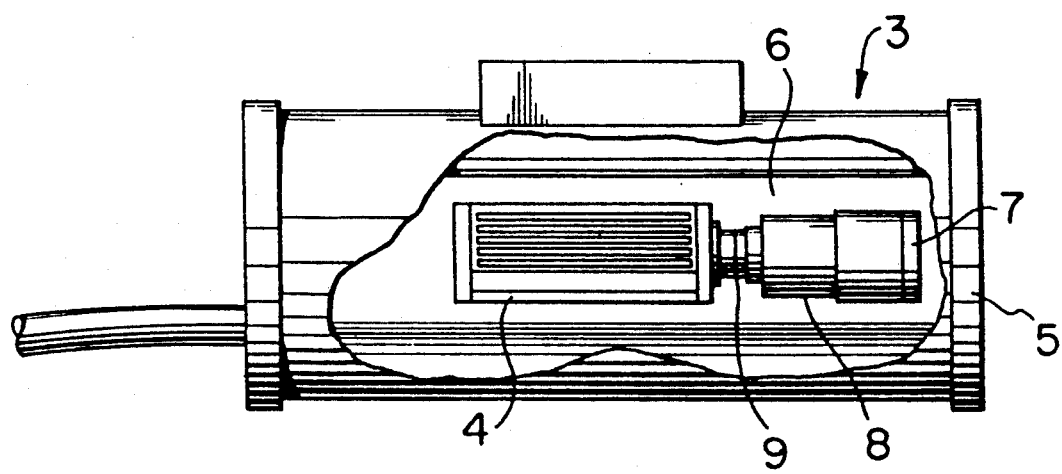
FIG. 2 is a diagram diagrammatic view of a camera for use in a apparatus in accordance with the invention.

The physical arrangement of the camera is shown in FIG. 2. The camera unit 3 contains the CCD camera 4 in an industrial, dust-tight camera housing with air cooling. The unit 3 has a transparent window 5 behind which is located lens system 6 consisting of a close-up lens 7, a 75 mm. zoom lens 8, and two times extender 9. This arrangement focuses the molten glass stream 1 onto the image plane of the CCD camera 4.

The purpose of the camera arrangement is to measure the width W(y) of the glass stream 1 (FIG. 3) and identify air bubbles 10 naturally occurring in the molten glass stream 1.

Figure 3:
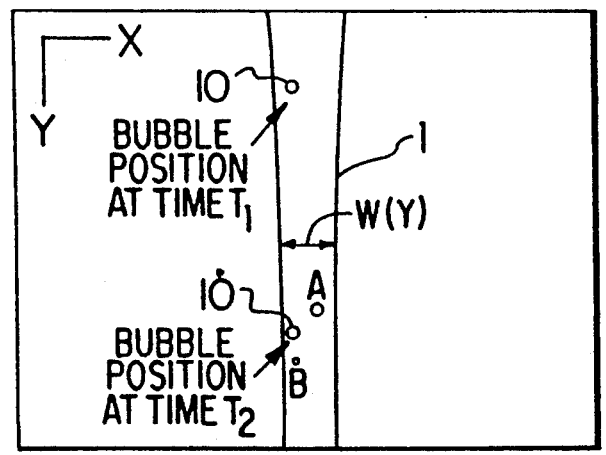
FIG. 3 is a diagram illustrating the movement of bubbles in the molten glass stream.

Referring now to FIG. 3, the volume of glass V contained between coordinates $y_1, y_2$, is given by the expression $$V = \frac{\Pi}{4} \int_{y^1}^{y^2} W(y)^2 dy \quad (2)$$

where W(y) is the width of the glass stream as a function of y.

The mass flow rate F is therefore given by the expression $$F = \frac{\Pi KG}{4(T_2 - T_1)} \int_{y^1}^{y^2} W(y)^2 dy \quad (3)$$

where $T_1, T_2$ are the times of measurement of the coordinates $y^1, y^2$, K is a calibration constant as defined above, and G is the density of the glass.

Consequently, since the incremental distance between each scanning line can be assumed to be a constant, the volumetric flow rate F can be derived from the sum of the widths of the glass stream 1 at each line between coordinates $y^1$, $y^2$, in accordance with formula (1) above, which is the discrete form of expression (3).

Figure 4:
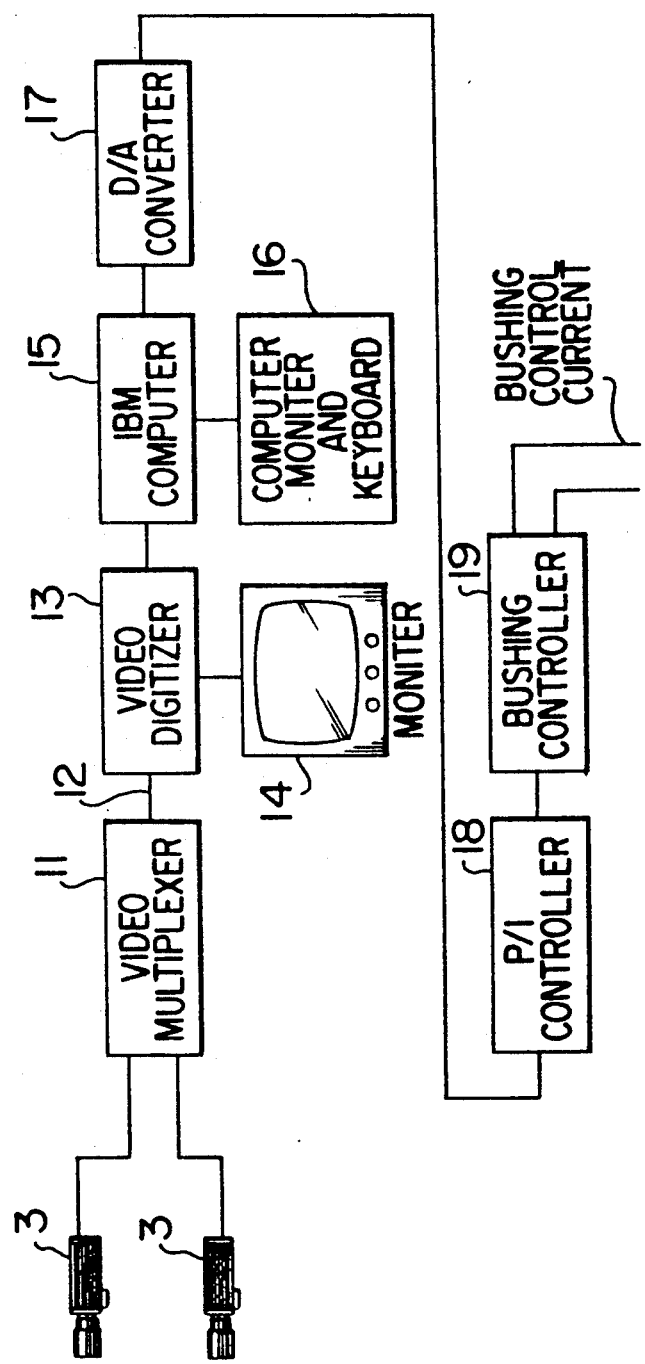
FIG. 4 is a block diagram in accordance with the invention.

The apparatus for determining these parameters is shown in FIG. 4. In FIG. 4, there are two camera units 3, 3' that each operate independently on different glass streams. Each video camera unit 3, 3' generates sufficient information alone to enable the volumetric flow rate of each glass stream to be monitored. However, two or more streams, each with its respective camera unit 3, can be monitored simultaneously, and for this purpose the outputs of the camera units 3, 3' are fed to a video multiplexer unit 11, which time division multiplexes the outputs of the camera units 3, 3' into a common multiplexed output signal 12.

Each cell of the CCD array in the camera units 3, 3' represents a picture element, or pixel, of the image formed in the camera. The output signals of the CCD cameras consist of analog pulses having a value related to the intensity of light falling on the corresponding cell in the CCD array.

The multiplexed analog pulses output at 12 are fed to a video digitizer 13, which quantizes the analog pulses into 256 levels represented by 8 bit bytes (0 to 255). The output of the video digitizer 13 is fed directly to video display monitor 14, where each image can be viewed directly by the operator for monitoring purposes.

The output of the video digitizer 13 is also fed to a processing unit 15, which can conveniently be an IBM 80286 AT personal computer attached to a keyboard and monitor 16. The computer can be programmed in a manner to be described later, or alternatively the processing unit 15 can be a hard wired custom designed circuit implementing the processing functions to be described.

The processing unit 15 outputs a signal representing the calculated flow rate, which signal is passed to a digital-to-analog convertor 17 that outputs an analog signal representative of the volumetric flow rate and that in turn is connected to a bushing controller 18 that controls the energy applied to the bushing in accordance with the measured volumetric flow rate and a desired set point. The operation of the apparatus will now be described as follows:

The video signals from the cameras 3 are fed into the video multiplexer 11, which allows the video signal from any single camera to be selected by the computer 15. The output from the multiplexer 11 is fed into the high speed video digitizer 13, which captures single frames of video and presents them to the computer in digital form. The captured images can be viewed directly on the monitor.

The computer 15 analyses the video frames and calculates a volumetric flow rate. The resulting flow rate is displayed on the computer screen in the form of a number and a graph and is also sent to the digital-to-analog converter, which produces an analog output signal proportional to the calculated flow rate. In the case where more than one camera is used, the computer 15 selects the video signal from each camera in turn, performing the flow rate calculations and updating the analog outputs for each camera.

The digitizer 13 captures and digitizes a single frame from the camera. This results in an array of numbers with 512 elements vertically and 512 elements horizontally. Each element in the array represents the intensity of the image at the corresponding pixel in the image. The intensities range from 0 for minimum intensity to 255 for maximum intensity.

Each captured frame contains two separate images defined by the fields as described above. The first field is contained in the even numbered lines (0,2,4, ..., 508,510). The second field is contained in the odd numbered lines (1,3,5, ..., 509,511). These fields represent two images taken at an interval of one-sixtieth of a second.

The first stage in the analysis involves identifying which part of the image represents the glass stream. To locate the left edge of the stream, each line of the image is scanned from left to right until the intensity of the pixels exceeds a certain threshold value (see FIG. 5D). The right edge is similarly located by scanning from right to left. This operation is performed for every line in the image to generate a table representing the left and right locations of the stream edge for every point along its vertical axis. In the event that an edge is not detected, the left and right locations are set to zero.

Figure 5A:
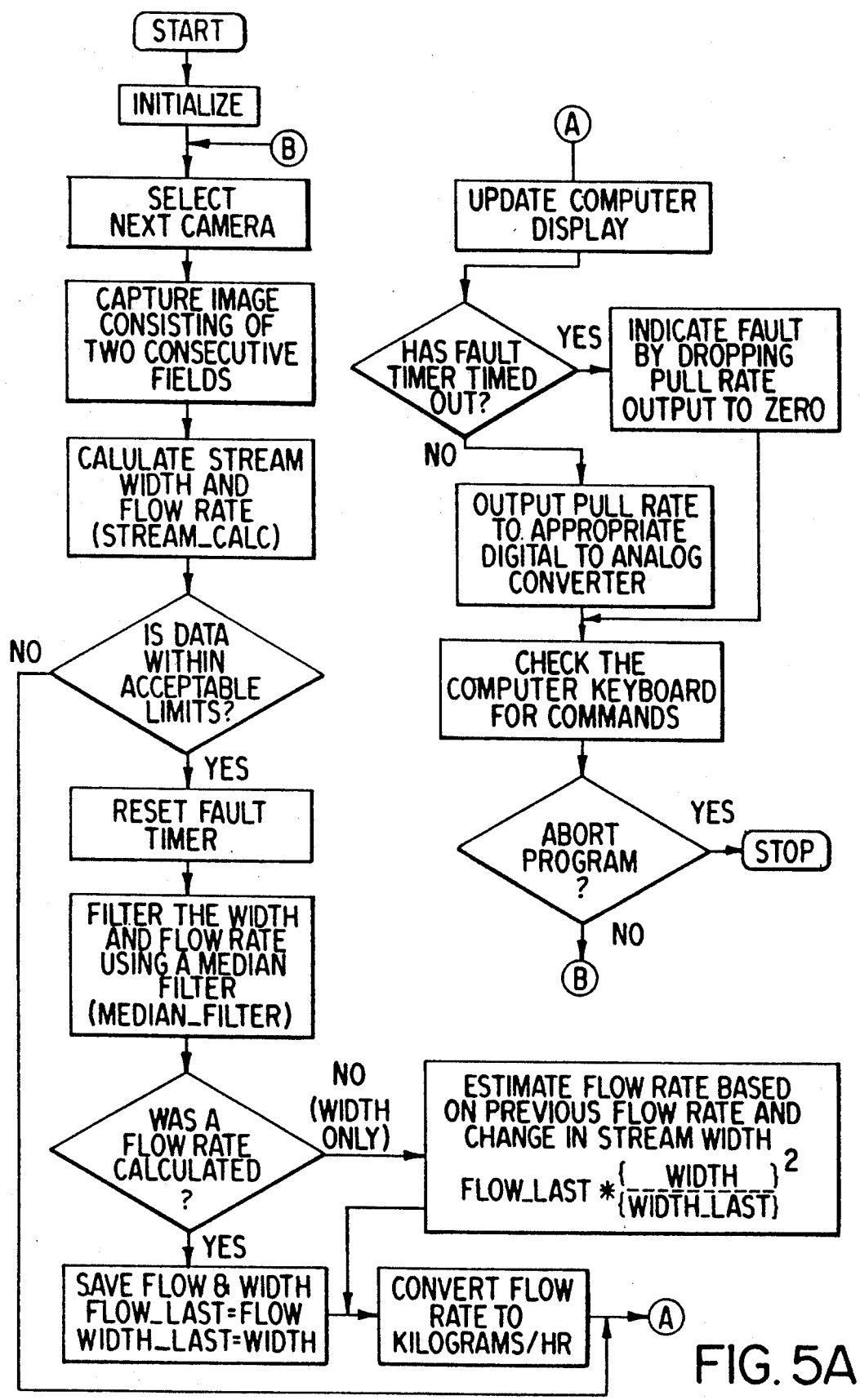
FIGS. 5a to 5j are flow charts illustrating the mode of operation of the processor in accordance with the invention.
Figures 5B, 5C:
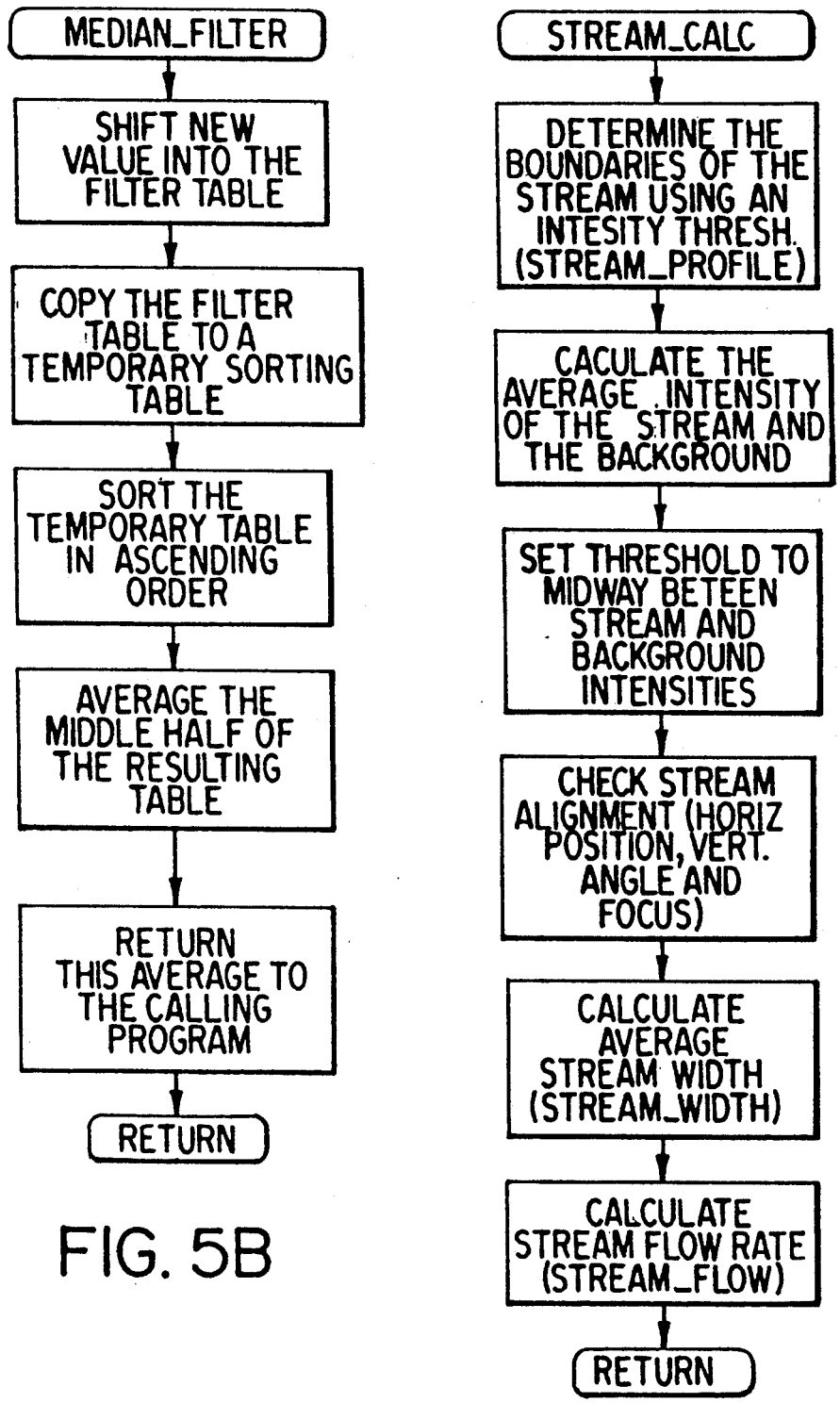
Figures 5D, 5E:
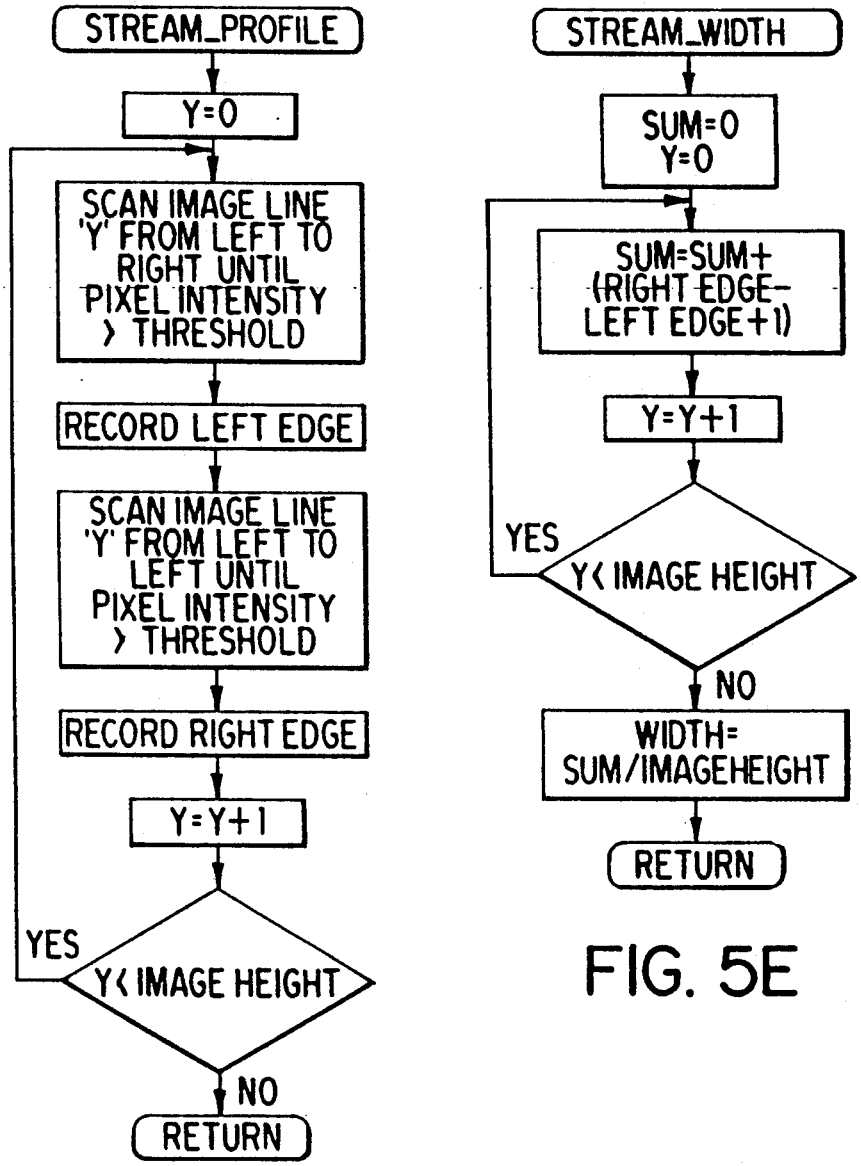

The second step determines the average width of the stream by taking the average distance between the left and right edges of the stream for each point along its vertical axis (see FIG. 5E).

In order to enable the apparatus to adapt to changing lighting conditions, the threshold value is adjusted to lie midway between the average intensity of the stream and the average intensity of the background after each image is processed. The stream intensity is calculated as the average pixel intensity of the pixels lying within the boundaries of the stream as determined in step 1. The background intensity is calculated as the average intensity of all pixels outside of the stream boundary.

Figure 5F:
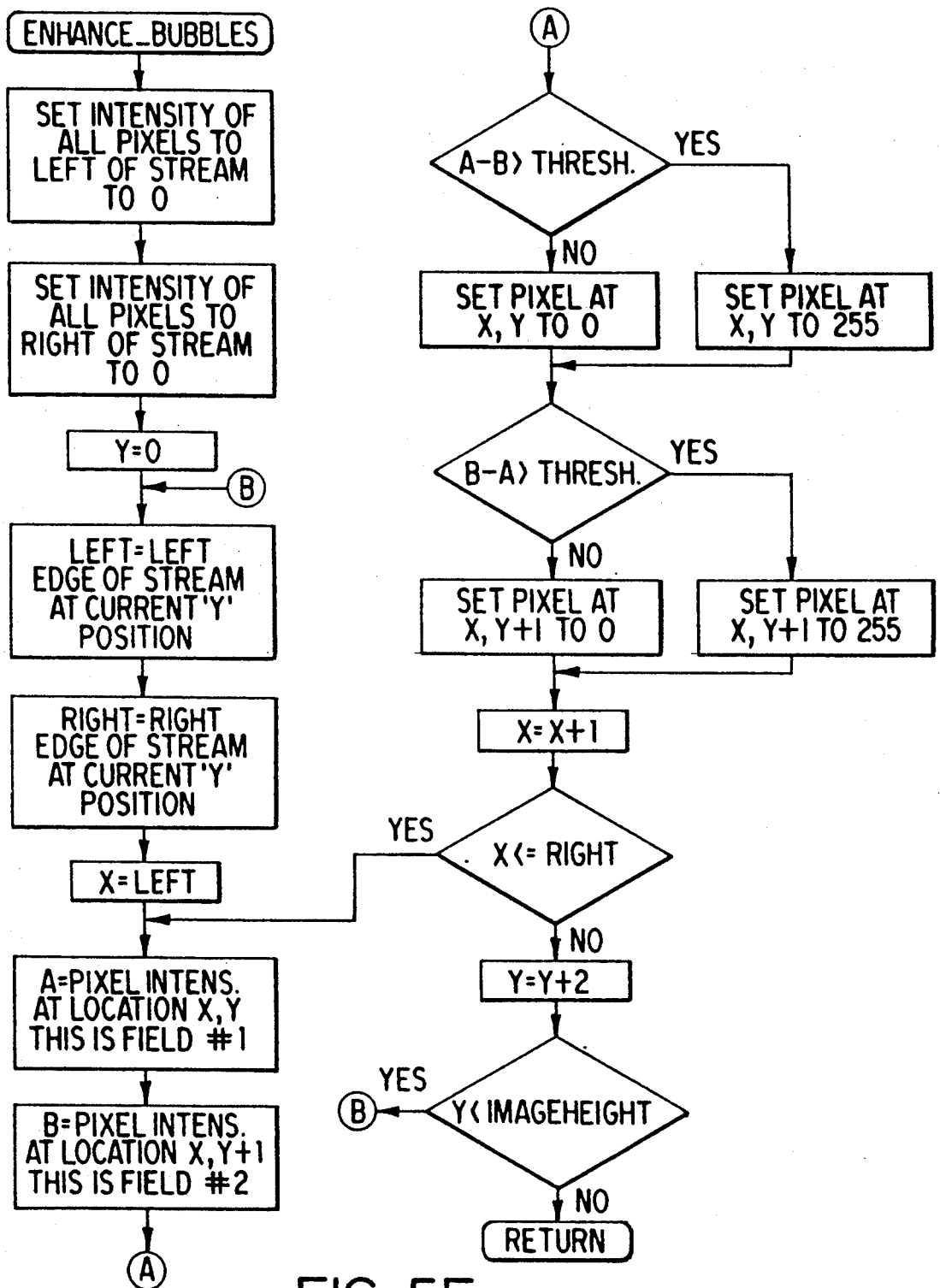
Figure 5G:
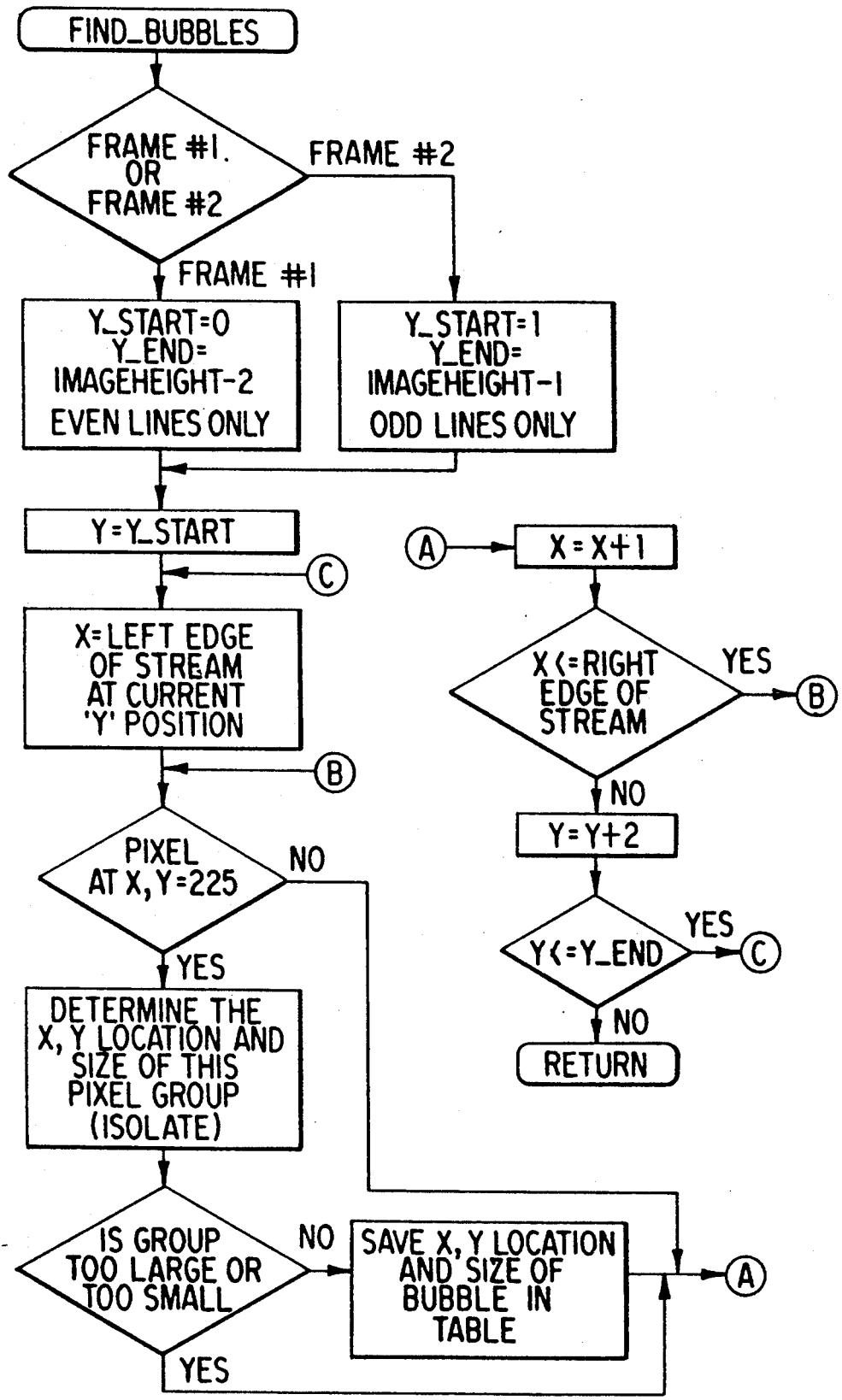
Figure 5H:
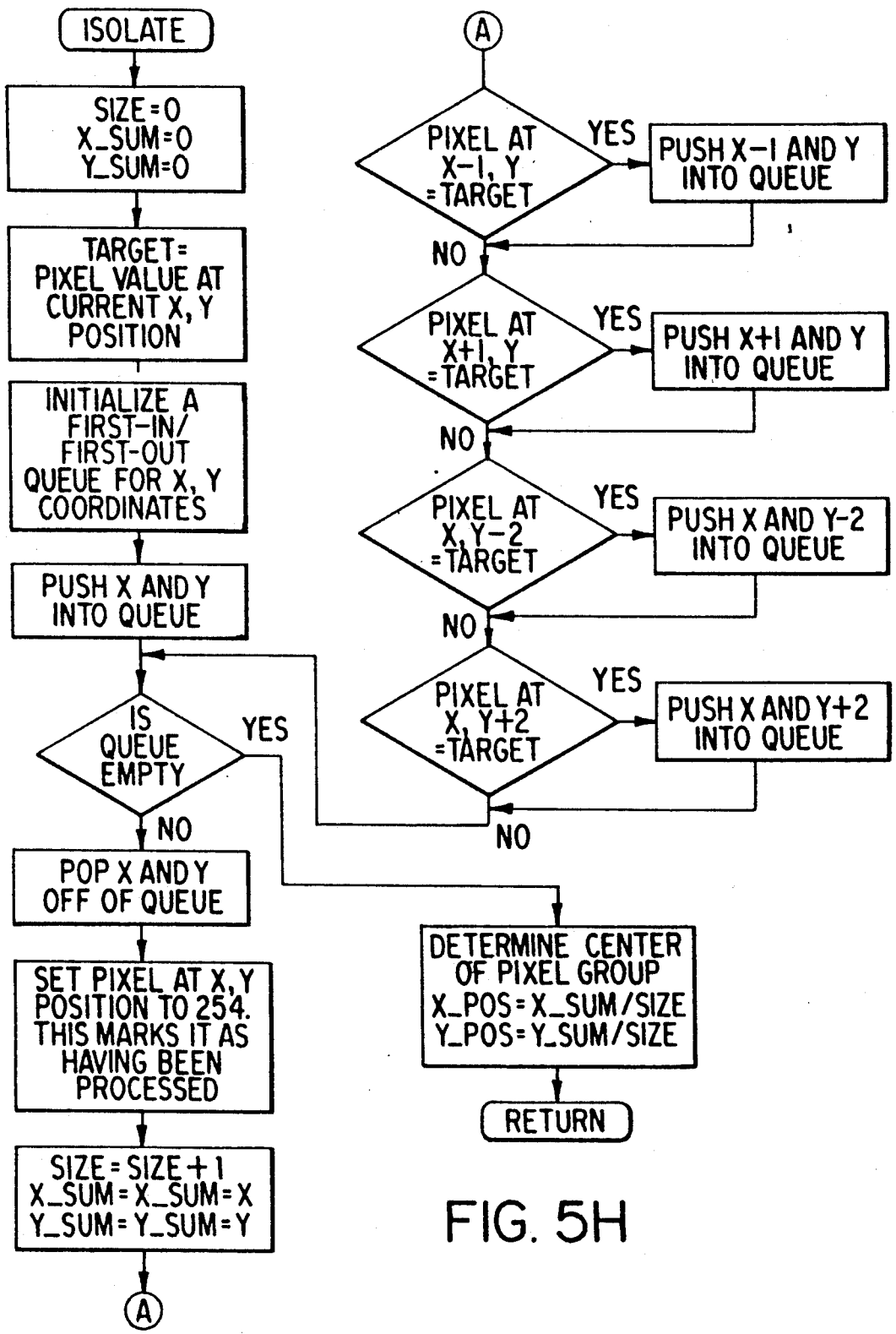
Figures 5I, 5J:
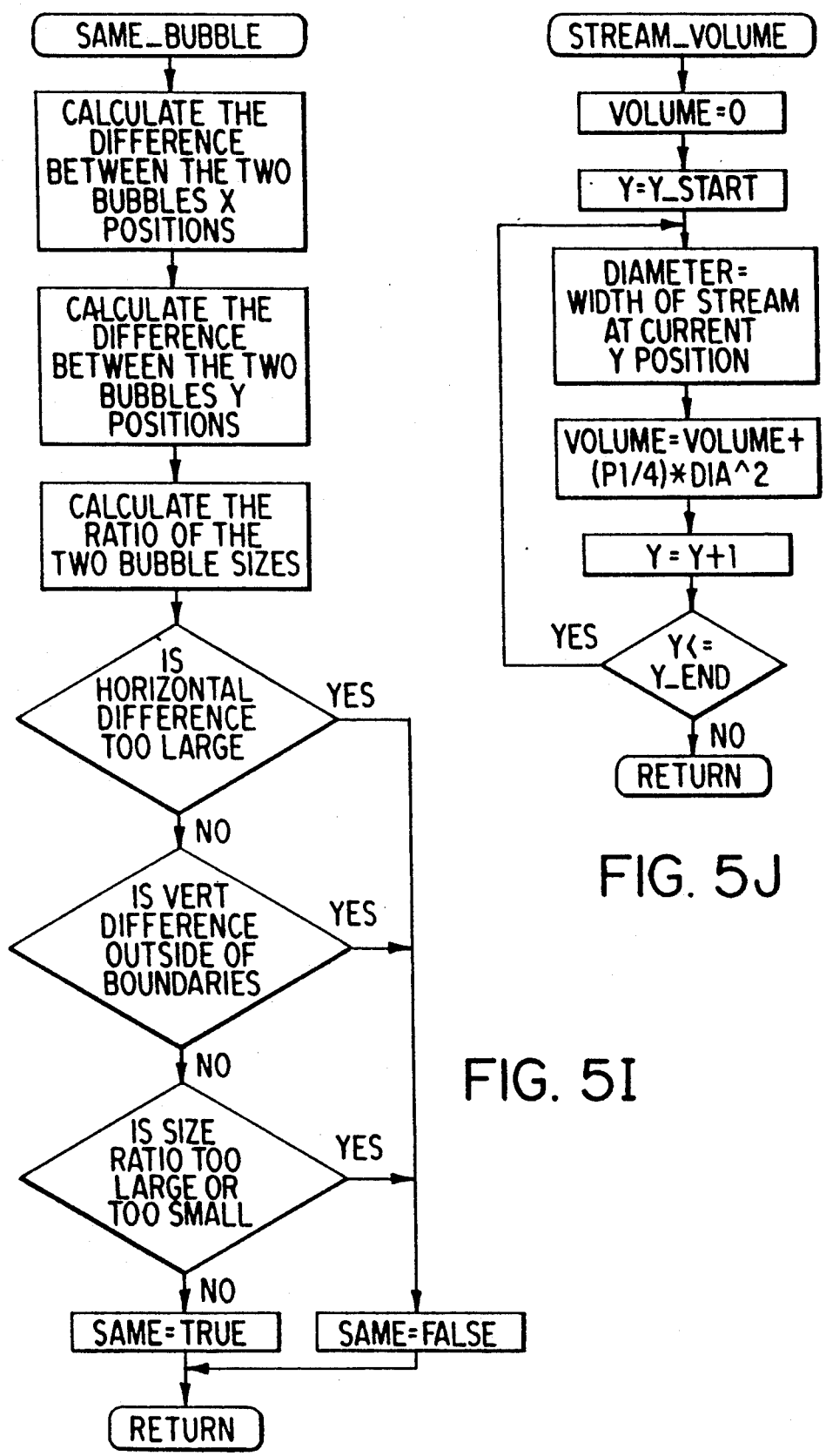

Next, the pixels representing bubbles within the stream must be identified. Bubbles show up in the image as bright regions within the stream. The only significant movement in the image is that of the bubbles. As a result, the bubbles can be highlighted by subtracting the pixels in the second field from the corresponding pixels in the first field. This resulting image represents the changes that have occurred between the two image fields. If the magnitude of the pixel difference is larger than a threshold value, then that pixel is assumed to be part of a bubble. If the difference is positive, the pixel belongs to a bubble located in the first field and if it is negative, it is located in the second fields. The pixels that are determined to represent bubbles in each of the fields are set to 255 and all other are set to zero (see FIG. 5F).

All of the bubbles, in both fields are then identified and their x, y locations and sizes determined. Bubbles with sizes above or below certain limits are ignored to eliminate noise.

Once the bubbles have been located, an attempt is made to identify bubbles that have shifted in location from one field to the next. This is accomplished by trying every possible combination of pairs of bubbles (one bubble from each field) and comparing their coordinates and sizes to see if they are the same bubble. Accurately matching the bubble pairs is possible because of the following:

1) Bubbles move very little horizontally between fields.

2) The distances the bubbles travel vertically between fields tend to lie within a small range.

3) The bubbles vary only slightly in size between fields. Using this information a bubble in the second field is considered to match a bubble in the first field the following conditions are met:

1) The difference between the X coordinates is less than 10.
2) The Y coordinate of the second bubble minus the Y coordinate of the first bubble lies between 320 and 380.
3) The ratio of the two bubbles sizes is no larger than 2 and no less than 0.5.

The actual number (320, 380 etc.) depends on the resolution of the camera and the magnification of the lens.

FIG. 3 shows an image of the stream with the two matching bubbles identified. Bubbles A and B have been rejected because of the above criteria. Bubble A is located too far to the right to be considered, while bubble B located directly below the first bubble is too small, and is rejected.

Once a pair of bubbles has been identified the flow rate can be calculated. Assuming that the glass stream is moving at the same rate as the bubbles, the amount of glass that has flowed past the camera during the time interval between fields is equal to the total volume of glass contained in the stream between the two Y coordinates of the bubbles. The flow rate can then be calculated from formula 1.

If no bubble pairs are found for this image, the flow rate can still be updated based on the width change alone using the equation:

$$Flow = LastFlow \left( \frac{Width}{LastWidth} \right)^2 \quad 2$$

where,

Width = Average width of stream
LastFlow = Last flow rate calculated
LastWidth = Average stream width at the time that LastFlow was calculated.

In this equation, the flow rate is estimated by multiplying the last determined flow rate by a factor that represents the ratio of the cross-sectional areas of the average width of the stream during the measurement to the area of the average width of the stream during the last measurement.

Once the digital signal representing the volumetric flow rate of the molten glass has been determined, this is output from the computer and converted back into an analog signal in the digital-to-analog converter 17. From there it is fed to PI (proportional integral) 18 controller, which in turn controls bushing controller 19 to set the energy input of the bushing 2. The control signal generated by the bushing controller 19 thereby controls the current flowing through the bushing 2, which in turn controls the glass flow rate.

The PI controller 18 adjusts the signal to the bushing controller 19 so as to maintain the glass flow rate at a given set point determined by the operator. The control is adjusted according to the formula:

$$Control = Control + P(E_o - E_l) + I(E_o)$$

where:

Control = Control signal
P = Proportional gain (constant)
I = Integral gain (constant)
$E_o$ = Present control error (Setpoint − Flow Rate)
$E_1$ = Previous control error In the event that the camera is unable to calculate the flow rate, the flow rate output from the camera is dropped to zero. When the control algorithm detects this, the PI algorithm is disabled and the control output is set to the average value of the control output over the previous ten minutes. When the output from the camera returns, the PI algorithm is re-enabled.

When the processing unit comprises an IBM AT2 86 computer, the following program can implemented:

```
Initialize hardware
Initialize data structures
loop
  for Each Camera
    Capture two successive images from selected camera
    Isolate stream from background and determine W(y)
    Calculate average stream width (W)
    Isolate bubbles from stream
    Determine x, y coordinates and sizes of all bubbles
    Match bubble pairs from the two images
    if Bubble Pair Found
      Calculate flow rate (F) by summing widths W(y)
      between bubble pairs using equation 1
      Replace F_o with F
      Replace W_o with W
    else
      Calculate flow rate (F) using equation 2
    endif
    Calculate filtered flow (Ff) to D/A converter
    Update user display
  endfor
endloop
end
```

The detailed source code listing is shown in Appendix I.

The described method and apparatus allow the volumetric flow rate to be controlled on a continuous basis while taking into account variations in the width of the glass stream. In accordance with the set point determined by the operator, the output characteristics of the molten glass stream can be continuously maintained within desired tolerances.

APPENDIX I

```
#include <alloc.h>
include <assert.h>
#include "bubble.hpp"

BubbleList::BubbleList (int NewSize)
//                   **********
//
```

```
// DESCRIPTION: Constructor for class BubbleList.  Allocates
memory for
//    NewSize bubbles and initializes class variables.
//
// INPUTS:   NewSize - Maximum number of elements in list.
// OUTPUTS: None
//
//                **********
{
   MaxSize = NewSize;
   Index = 0;
   CurrSize = 0;
   Bubbles = new Bubble [MaxSize];
   assert (Bubbles != NULL);
}

******************************* void BubbleList::Add (Bubble NewBubble)
//                **********
//
// DESCRIPTION: This method adds a new element to the end of
the list.
//
// INPUTS:   NewBubble - Bubble object to be added to list
// OUTPUTS: None
//
//                **********
{
   if (CurrSize < MaxSize) {
     Bubbles[CurrSize] = NewBubble;
     ++CurrSize;
   }
}

*****************************

Bubble*  BubbleList::First()
//                **********
//
// DESCRIPTION: This method returns a pointer to the first
bubble in the
//    list.
//
// INPUTS:   None
// OUTPUTS: First() - Pointer to head of list.
//
//                **********
{
   Index = 0;
   if (CurrSize > 0)
     return &Bubbles[Index];
   else
     return NULL;
}

*****************************
```

```
Bubble*  BubbleList::Next()
//                ********
//
// DESCRIPTION: This method returns a pointer to the next bubble in the
//    list.  The position in the list is kept track of by an index that
//    is private to this class.  Method First() must be called at least once
//    before this method is used.
//
// INPUTS:   None
// OUTPUTS:  Next() - Pointer to next element in list.
//
//                ********
{
    ++Index;
    if (Index < CurrSize)
      return &Bubbles[Index];
    else
      return NULL;
}
include <dos.h>
include <assert.h>
#include "dt2814.hpp"

dt2814::dt2814 (int NewBaseAddr)
//                ********
//
// DESCRIPTION: Constructor for class Dt2814.
//
// INPUTS: NewBaseAddr - Base address of board registers.
//
//                ********
{
    BaseAddr = NewBaseAddr;

for (int i = 0; i < 16; ++i) {
     LowRange[i] = 0.0;
     HighRange[i] = 0.0;
    }

Status = 0;
}

*****************************草 void dt2814::Scale (int Channel, float LowR, float HighR)
//                ********
//
// DESCRIPTION: Scales the range of the specified input channel from
//    LowR to HighR.
//
```

```
// INPUTS: Channel - Channel number
//         LowR    - Lower range of channel
//         HighR   - Upper range of channel
//
//              *********
{
    assert (Channel >= 0 && Channel < 16);
    assert (LowR < HighR);

LowRange[Channel] = LowR;
    HighRange[Channel] = HighR;
}

//***************************furthers float dt2814::Input (int Channel)
//              *********
//
// DESCRIPTION: Reads a value from the specified input channel.
//
// INPUTS: Channel - Input channel number (0 - 15)
//
//              *********
{
    assert (Channel >= 0 && Channel < 16);

outportb (BaseAddr, Channel & 0x0F);

int Finished;
    for (int i = 0; i < 100; ++i) {
     Finished = (inportb(BaseAddr) & 0x80) > 0;
     if (Finished)
        break;
     delay(1);
    } if (!Finished) {

Status = -1;    sound(1000); delay(100); nosound();
      return 0.0;
    } unsigned DataBits = (inportb(BaseAddr+1) << 4) + inportb(BaseAddr+1);
    float Data = LowRange[Channel] +
            (DataBits*(HighRange[Channel] -
LowRange[Channel])/4095);

Status = 0;
    return Data;
} include <dos.h>
include <assert.h>
```

```cpp
#include "dt2815.hpp"
#include "util.hpp"

// DT2815 Status register bit masks
const byte IBF = 0x02;
const byte F0  = 0x04;
const byte S0  = 0x10;
const byte S1  = 0x20;
const byte S2  = 0x40;

// DT2815 Initialization register bit masks
const byte D0  = 0x01;
const byte D1  = 0x02;
const byte D2  = 0x04;
const byte N0  = 0x08;
const byte N1  = 0x10;

// Function type casts
int dtReset (int Base, int Prog, int Channels);

//****************************** dt2815::dt2815 (int Prog, int Channels, int Mode, int Base)
//-------
//
// DESCRIPTION: Constructor function for class dt2815
//
// INPUTS:   Base     - Base address of DT2815 board (defaults to 0224h)
//           Prog     - Selects one of four firmware programs on the board.
//                      1 - Unipolar, mixed output modes.
//                      2 - Unipolar, all current output modes.
//                      3 - Bipolar, mixed output modes.
//                      4 - Self test mode.
//           Channels - Specifies the highest channel that can be used in
//                      subsequent operations on the board (range 0 - 7).
//           Mode     - Selects whether the board will generate a hardware
//                      current offset.
//                      0 - Firmware generates offset.
//                      1 - No firmware offset. Use for voltage output or
//                          hardware offset.
//
// OUTPUTS: Status - Return error code.
//                     0 - Ok
//                    -1 - Invalid program number specified.
//                    -2 - Invalid channel count specified.
//                    -3 - Invalid mode specified.
//                    -4 - Error initializing board.
//
```

```
// FUNCTIONS REFERNECED: dtReset()
//
//-------
{
    // Validate calling parameters
    if (Prog < 0 || Prog > 4) {
     Status = -1;                  /* Invalid program number
     return;
    } if (Channels < 0 || Channels > 7) {
     Status = -2;                  // Invalid channel count
     return;
    } if (Mode < 0 || Mode > 1) {
     Status = -3;
     return;                       // Invalid mode bit
    }

// Initialize class variables
    BaseAddr = Base;
    Program = Prog;
    ChannelCount = Channels;
    ModeSelect = Mode;

for (int i = 0; i <= 7; ++i) {
     LowRange[i] = 0.0;
     HighRange[i] = 0.0;
    }

// Reset board
    if (dtReset (BaseAddr, Program, ChannelCount) < 0)
     Status = -4;                  // Unable to reset board Status = 0;
}

******************************* void dt2815::Scale (int Channel, float LowR, float HighR)
//                   *********
//
// DESCRIPTION: Scales the output range of the specified
channel from
//    LowR to HighR.
//
// INPUTS:
//
//              *********
{
    assert (HighR > LowR);

LowRange[Channel] = LowR;
    HighRange[Channel] = HighR;
```

}

**************************

```
void  dt2815::Output (int Channel, float  Data)
//-------
//
// DECRIPTION: This function outputs a value to the specified D/A output
//    channel.
//
// INPUTS:   Channel - Channel number to output data to.
//           Data    - Output data in the range LowRange to HighRange
//
// OUTPUTS: Status   - Return error code.
//                      0 - Ok
//                     -2 - Channel number out of range
//                     -5 - Time-out error
//                     -6 - Board firmware failure
//
// FUNCTIONS REFERENCED: dtReset()
//
//-------
{
    int   Retry, i;
    byte  StatReg;
    float LowR  = LowRange[Channel];
    float HighR = HighRange[Channel];

// Validate the calling parameters
    if (Channel < 0 || Channel > ChannelCount) {
     Status = -2;       // Channel number out of range
     return;
    } assert (HighR > LowR);

// Scale the input into range 0.0 -> 1.0
    if (Data < LowR)  Data = LowR;
    if (Data > HighR) Data = HighR;
    float ScaledData = (Data - LowR)/(HighR - LowR);
    int BinData = (int)(ScaledData*4095);

for (Retry = 0; Retry < 2; ++Retry) {
     // Wait up to 100ms for board to respond
     for (i = 0; i < 100; ++i) {
         StatReg = inportb (BaseAddr + 1);

// Board is ready, break out of loop
         if ((StatReg & (S0|S1|S2|IBF)) == 0)
          break;

delay (1);
     }
```

```c
    // Board is ready, break out of retry loop
    if ((StatReg & (S0|S1|S2|IBF)) == 0)
        break;

// Board was not ready, reset and try again
    dtReset (BaseAddr, Program, ChannelCount);
} if ((StatReg & IBF) > 0) {
  Status = -5;        // Input buffer full time-out error
  return;
} if ((StatReg & S0) > 0) {
  Status = -5;        // Low byte time-out error */
  return;
} if ((StatReg & (S1|S2)) > 0) {
  Status = -6;        // Board firmware error */
  return;
}

// Board is Ok, output data
byte LowByte  = (BinData << 4) + (Channel << 1) + ModeSelect;
byte HighByte = BinData >> 4;

// Output low byte
outportb (BaseAddr, LowByte);
// Wait up to 100ms for board to process low byte
for (i = 0; i < 100; ++i) {
  StatReg = inportb (BaseAddr + 1);
  if ((StatReg & IBF) == 0)
      break;
  delay (1);
} if ((StatReg & IBF) > 0) {
  Status = -5;            // High byte time-out error
  return;
}

// Output high byte
outportb (BaseAddr, HighByte);

Status = 0;
}
```

**\*\*\*\*\*\*\*\*\*\*\*\*\*\*\*\*\*\*\*\*\*\*\*\*\*\*\*\*\*\***

```c
int dtReset (int Base, int Prog, int Channels)
//-------
//
// DESCRIPTION: This function resets and then initializes the DT2815
```

```
//    hardware.
//
// INPUTS:   Base     - Base address of DT2815 board.
//           Prog     - Firmware program number to use.
//           Channels - The highest channel number that can be used.
//
// OUTPUTS: dtReset() - Return error code.
//                      0 - Ok
//                     -1 - Time-out error
//
//-------
{
    int  i, Retry;
    byte StatReg, InitReg;

for (Retry = 0; Retry < 2; ++Retry) {
     // Reset board by writing to status register
     outportb (Base + 1, 0x00);

// Poll status register to determine if board is ready for input
        for (i = 0; i < 100; ++i) {
            StatReg = inportb (Base + 1);
            if ((StatReg & F0) > 0)
              break;
            delay (1);
        }
        if ((StatReg & F0) > 0)
            break;
    } if ((StatReg & F0) == 0)
      return (-1);                    // Board not ready, time-out error
    else {
      // Initialize the board for the specified channel count and
      // firmware program to be used.
      InitReg = Channels + ((Prog - 1) << 3);
      outportb (Base, InitReg);
    } return (0);
}
#include <assert.h>
#include "filter.hpp"
#include "util.hpp"

*****************************

MedianFilter::MedianFilter()
//                *********
//
// DESCRIPTION: Constructor for MedianFilter with default size of 10.
```

```
//
//                   *********
{
    MaxSize = 10;                    // Initialize class variables.
    Size = 0;
    Table = new float [MaxSize];     // Allocate memory for the table.
    assert (Table != 0);
}

*****************************

MedianFilter::MedianFilter (int NewMaxSize)
//                   *********
//
// DESCRIPTION: Constructor for class MedianFilter.  A buffer of size
//    NewMaxSize is allocated and class variables are initialized.  If there
//    is insufficient memory for the buffer, a run-time error will occur.
//
// INPUTS:   NewMaxSize - Maximum number of elements in filter table.
// OUTPUTS: None
//
//                   *********
{
    MaxSize = NewMaxSize;            // Initialize class variables.
    Size = 0;
    Table = new float [MaxSize];     // Allocate memory for the table.
    assert (Table != 0);
}

***************************** void MedianFilter::Resize (int NewMaxSize)
//                   *********
//
// DESCRIPTION: This method changes the size of the filter table.  Any
//    data already contained in the original table is copied into the new
//    table.  If there is insufficient memory for the new table, a run-time
//    error will occur.
//
// INPUTS:   NewMaxSize - New size of filter table.
// OUTPUTS: None
//
//                   *********
```

```
{
    if (NewMaxSize != MaxSize) {
        float *NewTable = new float [NewMaxSize]; // Allocate memory for the
        assert (NewTable != 0);                    // new table.

int NewSize = min (NewMaxSize, Size);     // Calculate the size of the
                                                  // new table.

for (int i = 0; i < NewSize; ++i)   // Copy usable data from old table
            NewTable [i] = Table [i];       // into the new table.

delete Table;           // Deallocate memory for the old table.
        Table = NewTable;       // Update class variables.
        MaxSize = NewMaxSize;
        Size = NewSize;
    }
}

******************************* float MedianFilter::Add (float NewData)
//           **********
//
// DESCRIPTION: This method adds a new data point to the filter table and
//    returns a new filtered value.  The table contains the 'MaxSize' most
//    recently aquired data points.  The returned value is calculated as the
//    average of the middle half of the sorted points.  This method of
//    filtering provides fast response to input signal changes while
//    providing high immunity to noise and spikes.
//
// INPUTS:   NewData - Most recently aquired data point.
// OUTPUTS: Add()    - Filtered data value.
//
//           **********
{
    Size = min (Size+1, MaxSize);    // Update the table size for (int i = Size-1; i > 0; --i)   // Shift the data to make room for
        Table [i] = Table [i-1];       // new data point Table [0] = NewData;      // Add new point to table float *SortTable = new float[Size];  // Allocate storage for a temporary
    assert (SortTable != 0);             // sorting table.
```

```
    for (i = 0; i < Size; ++i)       // Copy the data into the
new table
        SortTable[i] = Table[i];

// Sort the table in assending order (bubble sort)
    boolean Done;
    do {
      Done = true;

for (i = 0; i < Size-1; ++i) {
          if (SortTable [i] > SortTable [i+1]) {
            swap (SortTable[i], SortTable[i+1]);
            Done = false;
          }
      }
    } while (!Done);

// Calculate the average of the middle half of the table
    float Filt;
    float Total = 0.0;
    int Count = 0;
    int First = max (0, Size/4);
    int Last  = min (Size, Size*3/4);

for (i = First; i < Last; ++i) {
      Total = Total + SortTable[i];
      ++Count;
    } if (Count > 0)
      Filt = Total/Count;
    else
      Filt = SortTable [0];

delete SortTable;       // Deallocate memory used by the
temporary table.

return (Filt);
}
//-
//
//
//                    G L A S S   F L O W   S Y S T E M
//                          Graham FiberGlass Co.
//
//    Complied under Borland Turbo C++ v1.01
//
//-
#ifndef __LARGE__
#error "Must use LARGE memory model"
endif include <iostream.h>
include <stdio.h>
#include <stdlib.h>
#include <conio.h>
#include <dos.h>
```

```
#include <time.h>
#include <math.h>
#include <assert.h>
#include "gfs.hpp"
#include "image.hpp"
#include "profile.hpp"
#include "bubble.hpp"
#include "hrt512.hpp"
#include "dt2815.hpp"
#include "dt2859.hpp"
#include "filter.hpp"
#include "screen.hpp"
#include "param.hpp"
#include "util.hpp"

const int   NoCameras = 8;          // Number of cameras
const int   IWidth  = 120;          // Width of image buffer
const int   IHeight = 460;          // Height of image buffer
const float MaxPull = 400.0;        // Scale analog output
from 0 to this value
const int   FFilterSize = 10;       // Number of elements in
flow filter table
const int   WFilterSize = 10;       // Number of elements in
width filter table.
const int   MaxBubbles = 20;        // Maximum number of
bubbles that can be handled
                    // per image.
const int   MinSize = 3;            // Minimum acceptable
bubble size (in pixels).
const int   MaxSize  = 150;         // Maximum    "       "
 "    "    "
const int   BubbleThresh = 15;      // Differentiates bubbles
from stream.
const int   EdgeCount  = 3;         // Number of consecutive
pixels required above
                    // threshold for stream edge
detection.
const int   StdVel = 340;           // Typical bubble velocity
(pixels/(1/60s)).
const int   Vvar = 50;              // Vertical size of bubble
search window.
const int   Hvar =  4;              // Horizontal size of
bubble search window.

const char  ParamFile[]="gfs.cnf";  // Name of configuration
file

// Function cast declarations
void StreamCalc (ImageBuffer& Image, float& Flow,
         float& Width, float& Intensity, int& Align, float&
Angle,
         float& Focus, float& Std, int& BubbleCnt);
void StreamProfile (ImageBuffer& Image, Profile& Prof);
void Alignment (ImageBuffer& Image, Profile& Prof, int&
Align,
```

```
            float& Angle, float& EdgeRate, float& Std);
void StreamIntensity (ImageBuffer& Image, Profile& Prof,
            float& Fg, float& Bg);
float StreamFlow (Profile& Prof, BubbleList& BList1,
            BubbleList& BList2);
void EnhanceBubbles (ImageBuffer& Image, Profile& Prof);
void FindBubbles (ImageBuffer& Image, Profile& Prof, int
Frame,
            BubbleList& BList);
boolean SameBubble (Bubble B1, Bubble B2);

******************************* void main()
//              **********
//
// DESCRIPTION: This is the main module for program GFS.CPP
//
//              **********
{
    ImageBuffer Image(IWidth,IHeight);     // Video image
buffer
    Hrt512 Digitizer;                       // Video digitizer
    dt2815 AOut;                            // Analog output
card
    dt2859 Mux;                             // Video multiplexer
card
    MedianFilter FlowFilter[NoCameras];    // Flow rate data
filter
    MedianFilter WidthFilter[NoCameras];   // Width data filter
    StopWatch   BadData[NoCameras];        // Camera fault
timers
    StatusScreen   StatScreen;             // Operator status
screen
    ParamRecord   Param(NoCameras);        // Parameter file float Flow, FlowRate, Width, Intensity, Angle, Focus,
Std;
    float WidthLast [NoCameras], FlowLast [NoCameras];
    float FiltFlow [NoCameras], FiltWidth [NoCameras];
    int Align, i, Center[NoCameras], FullAlign, Sel = 0,
BubbleCnt;
    boolean Done, LastValid[NoCameras], Debug=false;

// Initialize filter tables and stream threshold
    for (i = 0; i < NoCameras; ++i) {
     FlowFilter[i].Resize (FFilterSize);
     WidthFilter[i].Resize (WFilterSize);
     FiltFlow[i] = 0.0;
     FiltWidth[i] = 0.0;
     FlowLast[i] = 0.0;
     WidthLast[i] = 0.0;
     LastValid[i] = false;
     Center[i] = Digitizer.MaxWidth()/2;
```

```
 BadData[i].Reset();
 AOut.Scale (i, 0.0, MaxPull);
}

Param.Load (ParamFile);

Mux.Select(0);
delay(1000);

Done = false;
while (!Done) {
  for (i = 0; i < NoCameras && !Done; ++i) {
    // Capture an image from the selected camera
    Digitizer.NextStill();
    Digitizer.ReadImage (Image, Center[i]-IWidth/2, 0);

// Select next camera
    Mux.Select((i+1) % NoCameras);

// Calculate the glass stream flow rate, width, and
intensity
        // from the captured image
    StreamCalc (Image, Flow, Width, Intensity,
            Align, Angle, Focus, Std, BubbleCnt);

// Check the horizontal alignment of the stream,
adjust the
        // video digitizer window to follow it.
    FullAlign = Center[i] + Align -
(Digitizer.MaxWidth()/2);
        Center[i] = FullAlign + (Digitizer.MaxWidth()/2);
        if (Center[i] >= Digitizer.MaxWidth() - IWidth/2)
         Center[i] = IWidth/2;
        else if (Center[i] <= IWidth/2)
         Center[i] = Digitizer.MaxWidth() - IWidth/2;

// Check that the numbers fall within acceptable
limits
        boolean ValidData = boolean ((Intensity >=
MinIntens) &&
            (abs(FullAlign) <= MaxAlign) && (Focus >=
MinFocus) &&
            (Std <= MaxStd) && (Width >= MinWidth) && (Width
<= MaxWidth));

if (ValidData && LastValid[i]) {
         // Data is Ok, reset the fault timer
         BadData[i].Reset();

// Filter the flow rate if one was available
        if (Flow > 0.0)
            FiltFlow[i] = FlowFilter[i].Add(Flow);

// Filter the width value if one was available
        if (Width > 0.0)
            FiltWidth[i] = WidthFilter[i].Add(Width);
    }
```

```
              LastValid[i] = ValidData;

if (Flow > 0.0) {
            // A flow rate was calculated, record flow rate and
width
             FlowLast[i] = FiltFlow[i];
             WidthLast[i] = FiltWidth[i];
             FlowRate = FiltFlow[i];
          }
          else if (FlowLast[i] > 0.0 && WidthLast[i] > 0.0)
             // No flow rate was calculated, estimate flow from
previous
             // flow rate and change in width
             FlowRate =
FlowLast[i]*pow(FiltWidth[i]/WidthLast[i], 2.0);
          else
             // Insufficient information to calculate flow
             FlowRate = 0.0;

boolean Fault = boolean(BadData[i].Elapsed() >
120.0);
          FlowRate = FlowRate * Param.Cal(i);

// Display the flow rate on the video display
          StatScreen.Update (i, FlowRate, FiltWidth[i],
Intensity,
                    FullAlign, Angle, Focus, Std, Fault,
                    boolean((Sel==i) && Debug));

// Output the flow rate to the selected D/A
converter
          if (!Fault)
            AOut.Output (i, FlowRate);
          else
            AOut.Output (i, 0.0);   // Unable to read glass
stream // Check for keyboard input
          boolean ParamChange = false;

while (kbhit()) {
            switch (getch()) {
               case '+': if (FlowRate > 0.0 && Debug) {
                         Param.Cal(Sel) =
Param.Cal(Sel)*200.5/200.0;
                         ParamChange = true;
                       }
                       break;

case '-': if (FlowRate > 0.0 && Debug) {
                         Param.Cal(Sel) =
Param.Cal(Sel)*199.5/200.0;
                         ParamChange = true;
                       }
                       break;
```

```
                case 0: switch (getch()) {
                    case 75: Sel = (Sel + NoCameras-1) %
NoCameras;
                        break;

case 77: Sel = (Sel + 1) % NoCameras;
                        break;

case 103: Debug = boolean(!Debug);
                        break;

case 104: system ("copy gfs.prn a:");
                        system ("if exist a:gfs.prn del
gfs.prn");
                        break;

case 119: Done = true;
                        break;
                    }
                    break;
            }
        } if (ParamChange)
            Param.Save (ParamFile);
        }
    }

Param.Save (ParamFile);
}

***************************** void StreamCalc (ImageBuffer& Image, float& Flow,
        float& Width, float& Intensity, int& Align, float&
Angle,
        float& Focus, float& Std, int& BubbleCnt)
//              **********
//
// DESCRIPTION: This function analyzes the image and attempts
to calculate
//   the stream width, flow rate, intensity, etc.  As long as
the stream is
//   visible, the width and intensity will always be
calculated. A flow rate
//   will only be available if a suitable set of bubbles was
observed. If
//   any of the parameters are unavailable they will be
returned as zero.
//
//              **********
{
    Profile   Prof (IHeight);
    BubbleList  BList1(MaxBubbles), BList2(MaxBubbles);
```

```
    float   Fg, Bg, EdgeRate;
    float   Flow1, Flow2;

// Determine the glass stream profile
    StreamProfile (Image, Prof);

// Calculate the average intensity of the glass stream
    StreamIntensity (Image, Prof, Fg, Bg);
    Intensity = Fg;

// Check camera alignment and focus
    Alignment (Image, Prof, Align, Angle, EdgeRate, Std);

if (Fg - Bg > 0.0)
      Focus = EdgeRate/(Fg - Bg);
    else
      Focus = 0.0;

if (Intensity < MinIntens)
      Align = -IWidth/2;

// Calculate the average width of the glass stream.
    Width = Prof.AvgWidth();

// Enhance the image so that only the bubbles remain
    EnhanceBubbles (Image, Prof);

// Locate and catagorize the bubbles in each of the two
image fields
    FindBubbles (Image, Prof, 1, BList1);
    FindBubbles (Image, Prof, 2, BList2);

// Count the number of bubbles in the stream
    BubbleCnt = BList1.ListSize() + BList2.ListSize();

// Due to limitiations with the present video digitizer
it cannot be
    // known which field preceeds the other.  Try the flow
rate calculation
    // in both orders and choose the one that produces a
result.
    Flow1 = StreamFlow (Prof, BList1, BList2);
    Flow2 = StreamFlow (Prof, BList2, BList1);

if (Flow1 > 0.0 && Flow2 == 0.0)
      Flow = Flow1;
    else if (Flow2 > 0.0 && Flow1 == 0.0)
      Flow = Flow2;
    else
      Flow = 0.0;
}

****************************** void StreamProfile (ImageBuffer& Image, Profile& Prof)
//              **********
//
```

```
// DESCRIPTION: This function determines the left and right limits of the
//    glass stream for each point along its length.  An edge of the stream is
//    considered to have been reached if EdgeCount consecutive pixels with
//    intensities above the threshold are observed when moving from the
//    outside towards the center of the image.  If an edge is not found for a
//    pariticular point, the coordinates for that point are set to zero.
//
// INPUTS:  Image    - The digitized image of the glass stream.
// OUTPUTS: Prof     - Left/Right limits of the stream.
//
//                    **********
{
    int  x, y, n, LeftEdge, RightEdge;

for (y = 0; y < IHeight; ++y) {
    // Calculate the min and max pixel values for this line
    int MinP = Image.MaxPixel();
    int MaxP = 0;
    for (x = 0; x < IWidth; ++x) {
        if (Image.Pixel(x,y) < MinP) MinP = Image.Pixel(x,y);
        if (Image.Pixel(x,y) > MaxP) MaxP = Image.Pixel(x,y);
    }

// Set threshold half-way between min and max values
    int Thresh = (MinP + MaxP)/2;

// Scan from left to right until the left edge of the stream is
    // detected
    for (x = 0, n = 0; x < IWidth  &&  n < EdgeCount; ++x) {
        if (Image.Pixel(x,y) > Thresh)
          ++n;
        else
          n = 0;
    } if (n == EdgeCount)
        LeftEdge = x - EdgeCount;
    else
        LeftEdge = 0;

// Scan from right to left until the right edge of the stream is
    // detected
    for (x = IWidth-1, n = 0; x >= 0  &&  n < EdgeCount; --x) {
        if (Image.Pixel(x,y) > Thresh)
          ++n;
        else
          n = 0;
```

```
        } if (n == EdgeCount)
            RightEdge = x + EdgeCount;
        else
            RightEdge = 0;

if (LeftEdge > 0  &&  RightEdge > 0  &&  RightEdge > LeftEdge) {
            Prof.Left(y) = LeftEdge;
            Prof.Right(y) = RightEdge;
        }
        else {
            Prof.Left(y) = 0;
            Prof.Right(y) = 0;
        }
    }
}

******************************* void Alignment (ImageBuffer& Image, Profile& Prof, int& Align,
            float& Angle, float& EdgeRate, float& Std)
//                    *********
//
// DESCRIPTION: This function checks the stream for horizontal alignment and
//    focus.  The returned variable 'align' represents the distance of the
//    stream from the center of the image and can be used to alarm if the
//    stream is drifting off of the screen.  The variable 'edge_rate' is the
//    rate of change of brightness across the stream/background boundary and
//    can be used to alarm for focus.
//
// INPUTS:   Image     - Digitized image of glass stream.
//           Prof      - Left/Right limits of glass stream.
// OUTPUTS:  Align     - Distance of stream from center (pixels).
//           EdgeRate  - Rate of change of intensity at stream edge.
//           Angle     - Angle of stream from vertical (degrees).
//           Std       - S.T.D. of glass stream horizontal position.
//
//                    *********
{
    long  HSum;
    float ESum, Err, Top, Bottom;
    int   y, pl, pr, Horiz, HorizPos;
```

```
    HSum = 0;
    ESum = 0.0;

for (y = 0; y < IHeight; ++y) {
     pl = Prof.Left(y);
     pr = Prof.Right(y);

HSum = HSum + (pl + pr)/2;
     if (pl-1 >= 0 && pl+1 < IWidth && pr-1 >= 0 && pr+1 <
IWidth) {
          ESum = ESum + ((Image.Pixel(pl+1,y) -
Image.Pixel(pl-1,y)) +
                    (Image.Pixel(pr-1,y) -
Image.Pixel(pr+1,y)))/4.0;
     }
    }

HorizPos = int(HSum/IHeight);

Err = 0.0;
    for (y = 0; y < IHeight; ++y) {
     Horiz = (Prof.Left(y) + Prof.Right(y))/2;
     Err = Err + pow((Horiz - HorizPos), 2.0);
    }

Align    = HorizPos - IWidth/2;
    EdgeRate = ESum/float(IHeight);
    Std      = sqrt (Err/float(IHeight));

// Calculate angle of stream from vertical
    Top = (Prof.Right(0) + Prof.Left(0))/2.0;
    Bottom = (Prof.Right(IHeight-1) + Prof.Left(IHeight-
1))/2.0;
    Angle = (180.0/M_PI)*atan((Top - Bottom)/float(IHeight));
}

******************************* void StreamIntensity (ImageBuffer& Image, Profile& Prof,
              float& Fg, float& Bg)
//                    **********
//
// DESCRIPTION: This function calculates the average
intensity of all of the
//    pixels within the limits of the glass stream.
//
// INPUTS:  Image     - Digitized image of stream.
//          Prof      - Left/Right limits of stream.
// OUTPUTS: Fg        - Average stream intensity.
//          Bg        - Average background intensity.
//
//                    **********
{
    const int IStep = 4;

long Sum, Count;
    int  x, y;
```

```
// Calculate the average intensity of the stream
Sum = 0;
Count = 0;

for (y = 0; y < IHeight; y=y+IStep) {
  for (x = Prof.Left(y); x < Prof.Right(y); x=x+IStep) {
     Sum = Sum + Image.Pixel(x,y);
     ++Count;
  }
} if (Count > 0)
  Fg = float(Sum)/float(Count);
else
  Fg = 0.0;

// Calculate the average intensity of the background
Sum = 0;
Count = 0;
for (y = 0; y < IHeight; y=y+4) {
  for (x = 0; x < Prof.Left(y); x=x+4) {
     Sum = Sum + Image.Pixel(x,y);
     ++Count;
  } for (x = Prof.Right(y) + 1; x < IWidth; x=x+4) {
     Sum = Sum + Image.Pixel(x,y);
     ++Count;
  }
} if (Count > 0)
  Bg = float(Sum)/float(Count);
else
  Bg = 0.0;
}

******************************//// float StreamFlow (Profile& Prof, BubbleList& BList1,
         BubbleList& BList2)
//                 *********
//
// DESCRIPTION: This function attempts to match the bubbles from the two
//     frames.  If any pairs are found, a flow rate (pixels^3/(1/60s)) is
//     calculated.  If more than one pair is found, the average flow rate is
//     returned.  The flow rate is determined by calculating the total volume
//     of the stream between the two vertical locations of the bubbles.
//
// INPUTS: Profile  - Left/Right limits of the stream.
//         BList1   - List of bubbles from the first field.
```

```
//           BList2    - List of bubbles from the second field.
//
// OUTPUTS: StreamFlow() - Calculated flow rate
(pixels^3/(1/60s)).
//
//              **********
{
    int FlowCount, Matches;
    float Flow, FlowSum, AvgFlow;
    Bubble *B1, *B2;

FlowSum = 0.0;
    FlowCount = 0;

// For each bubble in the first field, try matching it with each of the
    // bubbles in the second field
    for (B1 = BList1.First(); B1 != NULL; B1 = BList1.Next())
    {
        // Count the number of matches made
        Matches = 0;

for (B2 = BList2.First(); B2 != NULL; B2 = BList2.Next()) {
            // If it is possible that the bubbles match, calculate the
            // volume rate of flow.
            if (SameBubble (*B1, *B2)) {
              Flow = Prof.Volume (B1->GetY(), B2->GetY()-1);
              ++Matches;
            }
        }

// If there was exactly one match, there is a high probability
        // that the bubble pairing was correct.  Add in this pair's volume
        // rate of flow
        if (Matches == 1) {
            FlowSum = FlowSum + Flow;
            ++FlowCount;
        }
    }

// If at least one pair of bubbles was found, calculate the average
    // flow rate, otherwise return zero
    if (FlowCount > 0)
     AvgFlow = FlowSum/FlowCount;
    else
     AvgFlow = 0.0;

return AvgFlow;
}
```

\*\*\*\*\*\*\*\*\*\*\*\*\*\*\*\*\*\*\*\*\*\*\*\*\*\*\*\*

```
void EnhanceBubbles (ImageBuffer& Image, Profile& Prof)
//            **********
//
// DESCRIPTION: This function separates the pixels representing bubbles from
//     those representing the stream by looking for pixels that are
//     significantly brighter than the corresponding pixel in the other frame.
//
// INPUTS:  Image - Digitized image of glass stream.
// OUTPUTS: Prof  - Left/Right limits of stream.
//
//            **********
{
    int  x, y, Left, Right;
    PixelT a, b;

// Process the image one pair of lines at a time (one line from each
    // field) and check for intensity changes from one field to the next.
    for (y = 0; y < IHeight; y = y + 2) {
      // Only enhance bubbles where the streams from the two fields
      // overlap.  This prevents the creation of vertical bands along
      // the stream edges when the stream moves from side to side.
      Left  = max (Prof.Left(y), Prof.Left(y+1)) + 2;
      Right = min (Prof.Right(y), Prof.Right(y+1)) - 2;

if (Left  < 0 || Left  >= IWidth) Left  = 0;
      if (Right < 0 || Right >= IWidth) Right = 0;

// Set everthing to the left of the stream to minimim intensity
      for (x = 0; x < Left; ++x) {
         Image.Pixel(x,y)   = 0;
         Image.Pixel(x,y+1) = 0;
      }

// Enhance any intensity variations within the stream.
      for (x = Left; x <= Right; ++x) {
         a = Image.Pixel(x,y);
         b = Image.Pixel(x,y+1);

// If the pixel in field #1 is significantly brighter than the
         // corresponding pixel in field #2, set it to maximum intensity.
         if (a - b > BubbleThresh)
           Image.Pixel(x,y) = Image.MaxPixel();
         else
           Image.Pixel(x,y) = 0;
```

```
          // If the pixel in field #2 is significantly
brighter than the
          // corresponding pixel in field #1, set it to
maximum intensity.
          if (b - a > BubbleThresh)
            Image.Pixel(x,y+1) = Image.MaxPixel();
          else
            Image.Pixel(x,y+1) = 0;
        }

// Set everthing to the right of the stream to minimum
intensity
        for (x = Right + 1; x < IWidth; ++x) {
            Image.Pixel(x,y)   = 0;
            Image.Pixel(x,y+1) = 0;
        }

// Highlight the stream edge
        if (Left > 0) {
            Image.Pixel (Left-1,y)   = Image.MaxPixel()-50;
            Image.Pixel (Left-1,y+1) = Image.MaxPixel()-50;
        } if (Right < IWidth-1) {
            Image.Pixel (Right+1,y)   = Image.MaxPixel()-50;
            Image.Pixel (Right+1,y+1) = Image.MaxPixel()-50;
        }
      }
}

******************************* void FindBubbles (ImageBuffer& Image, Profile& Prof, int
Frame,
                  BubbleList& BList)
//                **********
//
// DESCRIPTION: This function scans the specified image field
for bubbles.
//   The coordinated and sizes of any bubbles that are found
are recorded in
//   the array 'bubbles.'  Bubble sizes above or below
certain limits are
//   ignored to eliminate noise from the image.
//
// INPUTS:   Image  - Digitized image of stream.
//           Prof   - Left/Right limits of stream.
//           Frame  - Number of the frame to be used (1 or 2)
// OUTPUTS: BList   - List of bubble coordinates and sizes.
//
//                **********
{
    int StartY, EndY, PosX, PosY, BSize, x, y;

assert (IHeight % 2 == 0);   // IHeight must be even
```

```
    // If frame #1 start at line 0, otherwise start at line 1
    if (Frame == 1) {
     StartY = 0;
     EndY   = IHeight-2;
    }
    else {
     StartY = 1;
     EndY   = IHeight-1;
    }

BList.Reset();

// Scan the stream area for highlighted pixels.  Note: y coord is
    // incremented by 2 in order to maintain the current field.
    for (y = StartY; y <= EndY; y = y + 2) {
      for (x = Prof.Left(y); x <= Prof.Right(y); ++x) {
        if (Image.Pixel(x,y) == Image.MaxPixel()) {
          // When a highlighted pixel is found, find all of the pixels
          // connected to it and calc. the objects location and size
          Image.Flood (x, y, Image.MaxPixel()-1, PosX, PosY, BSize);

// Scale PosX from 0 to 100 (0 = left edge, 100 = right edge)
          int Lt = Prof.Left(PosY);
          int Rt = Prof.Right(PosY);

if (Rt - Lt > 0)
              PosX = 100*(PosX - Lt)/(Rt - Lt);
          else
              PosX = -1;

// If the bubble's size is within acceptable limits, add the
          // info to the bubble table
          if (BSize >= MinSize && BSize <= MaxSize && PosX >= 0)
              BList.Add (Bubble(PosX, PosY, BSize));
          else
              Image.Flood (x, y, 0, PosX, PosY, BSize);
        }
      }
    }
}

***************************** boolean SameBubble (Bubble B1, Bubble B2)
//                  *********
//
// DESCRIPTION: This function takes the coordinates and sizes of two bubbles
```

```
//     taken from two successive image fields and determines if
they could be
//     the same bubble.
//
// INPUTS:   B1          - Bubble from the first frame.
//           B2          - Bubble from the second frame.
// OUTPUTS:  SameBubble  - True if bubbles match, False
otherwise.
//
//                 *********
{
    boolean Match = true;

assert (B1.Size() > 0);
    assert (B2.Size() > 0);

// Within horizontal limits?
    if (B2.GetX() < B1.GetX() - Hvar  ||  B2.GetX() >
B1.GetX() + Hvar)
        Match = false;

// Within vertical limits?
    if (B2.GetY() < B1.GetY() + StdVel - Vvar  ||  B2.GetY()
> B1.GetY() + StdVel + Vvar)
        Match = false;

// Bubbles must be approximately the same size for a
match
    if (B1.Size()/B2.Size() > 2  ||  B2.Size()/B1.Size() > 2)
        Match = false;

return Match;
} include <iostream.h>
include <stdlib.h>
#include <dos.h>
include <assert.h>
#include <mem.h>
#include "util.hpp"
#include "image.hpp"
#include "hrt512.hpp"

const unsigned CtrlRegOffset   = 0x2000;
const unsigned YRegOffset      = 0x2002;
const unsigned CrtcStatOffset  = 0x3000;
const unsigned CrtcAddrOffset  = 0x3000;
const unsigned CrtcDataOffset  = 0x3001;
const unsigned PalAddrOffset   = 0x3400;

const byte OE  = 0x01;
const byte GE  = 0x02;
const byte SG  = 0x04;
const byte CG  = 0x08;
const byte WE  = 0x10;
const byte RE  = 0x20;
const byte SS  = 0x40;
const byte UGD = 0x80;
```

```
const byte WinWidth  = 1;
const byte WinHeight = 6;
const byte WinHoriz  = 2;
const byte WinVereet = 7;
const byte BufVert   = 12;
const byte BufHoriz  = 13;

const byte SynchMask = 0x20;

//*****************************

Hrt512::Hrt512 (unsigned BaseSeg)
//              **********
//
// DESCRIPTION: Constructor for class Hrt512.  This contructor determines
//    if a HRT board is located at the specified address  If a board is
//    found it is initialized.
//
// INPUTS: BaseSeg - Base segment of the HRT board ram.
//
//              **********
{
    static byte NtscTable [14] = {78,64,66,85,64,2,60,60,7,7,0,0,0,0};
    byte OrgAddr, OrgData, OrgCursor;

BaseAddr = (byte*)(((unsigned long)BaseSeg)<<16);
    CtrlReg  = BaseAddr + CtrlRegOffset;
    CrtcAddr = BaseAddr + CrtcAddrOffset;
    CrtcData = BaseAddr + CrtcDataOffset;
    CrtcStat = BaseAddr + CrtcStatOffset;
    YReg     = (word*)(BaseAddr + YRegOffset);
    PalAddr  = BaseAddr + PalAddrOffset;

OrgAddr = *CrtcAddr;
    OrgData = *CrtcData;
    *CrtcAddr = 0x0E;
    OrgCursor = *CrtcData;
    *CrtcData = 0xFF;

if (*CrtcData != 0x3F) {
    *CrtcData = OrgAddr;
    *CrtcData = OrgData;
    Status = -1;

cerr << "Video digitizer not found.\n";
    exit (-1);
    }

*CrtcData = OrgCursor;
    *CrtcAddr = OrgAddr;
```

```
    *CtrlReg = UGD;   delay (1);
    *CtrlReg = UGD-1; delay (1);

for (int i = 0; i < 14; ++i) {
     *CrtcAddr = i; delay (1);
     *CrtcData = NtscTable[i]; delay (1);
    }

*CtrlReg = UGD;   delay(1);
    *CtrlReg = UGD-1; delay(1);

*PalAddr = 0; delay (1);
    for (i = 0; i < 256; ++i) {
     *(PalAddr + 1) = i; delay (1);
     *(PalAddr + 1) = i; delay (1);
     *(PalAddr + 1) = i; delay (1);
    }

*(PalAddr + 2) = 0xFF;

LiveVideo();
    Status = 0;
}

***************************** void Hrt512::LiveVideo()
//              *********
//
// DESCRIPTION: This method sets the Hrt board to display
live video>
//
//              *********

{
    *CtrlReg = OE|WE|UGD;
} void Hrt512::FreezeVideo()
//              *********
//
// DESCRIPTION: This method freezes the video display and
waits for two
//    vertical retraces.
//
//              *********
{
    *CtrlReg = OE|CG|WE|UGD;

Retrace (3);
}
```

```
void Hrt512::NextStill()
//              *********
//
// DESCRIPTION: This method captures the next still frame.
//
//              *********
{
    *CtrlReg = OE|CG|WE|UGD;
    *CtrlReg = OE|CG|WE|UGD|SG;

Retrace (5);
} void Hrt512::Retrace (int n)
//              *********
//
// DESCRIPTION: This method waits for the specified number of vertical
//    retraces to occur then returns.
//
// INPUTS: n - Number of retraces to wait for.
//
//              *********
{
    for (int i = 0; i <= n; ++i) {
      while ((*CrtcStat & SynchMask) != 0)
          ;

while ((*CrtcStat & SynchMask) == 0)
          ;
    }
}

//****************************** void Hrt512::ReadImage (ImageBuffer& Image, int StartX, int StartY)
//              *********
//
// DESCRIPTION: This method reads an image from the Hrt buffer into the
//    specified image buffer starting at location StartX, StartY.
//
// INPUTS:   StartX, StartY - Position in Hrt buffer to read from.
//
// OUTPUTS: Image - Captured image data.
//
//              *********
{
    assert (StartY + Image.Height() <= Hrt512::MaxHeight());
    assert (StartX + Image.Width() <= Hrt512::MaxWidth());
```

```
        for (int y = 0; y < Image.Height(); ++y) {
         *YReg = y + StartY;
         void* p = &Image.Pixel(0,y);
         memcpy (p, (void *)(BaseAddr + StartX), Image.Width());
        }
} void Hrt512::ShowImage (ImageBuffer& Image, int StartX, int StartY)
//                      **********
//
// DESCRIPTION: This method writes an image to the Hrt buffer starting
//    at location StartX, StartY.
//
// INPUTS: Image           - Digitized image to write.
//         StartX, StartY - Position in Hrt buffer to put image.
//
//                      **********
{
    for (int y = 0; y < Image.Height(); ++y) {
     *YReg = y + StartY;
     void* p = &Image.Pixel(0,y);
     memcpy ((void *)(BaseAddr + StartX), p, Image.Width());
    }
}
include <iostream.h>
#include <assert.h>
#include <alloc.h>
#include "image.hpp"
#include "queuexy.hpp"

ImageBuffer::ImageBuffer()
//                      **********
//
// DESCRIPTION: Constructor for class ImageBuffer.  Creates a buffer
//    with a width and height of zero.
//
//                      **********
{
    ImageWidth = 0;
    ImageHeight = 0;
    Buffer = NULL;
}

ImageBuffer::ImageBuffer (int Width, int Height)
//                      **********
//
// DESCRIPTION: Contructor for class ImageBuffer.  Creates a buffer
//    with specified width and height.
```

```
//
// INPUTS: Width   - Width of buffer in pixels
//         Height  - Height of buffer in pixels
//
//              **********
{
    ImageWidth = 0;
    ImageHeight = 0;
    Buffer = NULL;

Resize (Width, Height);
}

*****************************

ImageBuffer::~ImageBuffer()
//              **********
//
// DESCRIPTION: Destructor for class ImageBuffer.
Deallocates all memory
//   used by buffer.
//
//              **********
{
    for (int i = 0; i < ImageHeight; ++i)
      delete Buffer[i];

delete Buffer;
}

***************************** void ImageBuffer::Resize (int Width, int Height)
//              **********
//
// DESCRIPTION: This method resizes the image buffer to the
specified
//   dimensions.  Any data in the original buffer is
destroyed.
//
// INPUTS: Width   - Width of new image
//         Height  - Height of new image
//
//              **********
{
    if (Buffer != NULL) {
      for (int i = 0; i < ImageHeight; ++i)
          delete Buffer[i];

delete Buffer;
    }

ImageWidth = Width;
    ImageHeight = Height;
```

```
    Buffer = new PixelT* [ImageHeight];
    assert (Buffer != NULL);

for (int i = 0; i < ImageHeight; ++i) {
     Buffer[i] = new PixelT [ImageWidth];
     assert (Buffer[i] != NULL);
    }
}

******************************* void ImageBuffer::Fill (PixelT Value)
//                     **********
//
// DESCRIPTION: This method fills the entire image with a
specified value.
//
// INPUTS: Value - Fill image with this value
//
//                     **********
{
    Fill (0, 0, ImageWidth-1, ImageHeight-1, Value);
} void ImageBuffer::Fill (int x1, int y1, int x2, int y2,
PixelT Value)
//                     **********
//
// DESCRIPTION: This method fills a rectangular region of the
image with
//    a specified value.
//
// INPUTS: x1, y1 - Co-ordinates of upper-left of fill region
//         x2, y2 - Co-ordinates of lower-right of fill
region
//         Value  - Fill the region with this value
//
//                     **********
{
    assert (x1 <= x2 && y1 <= y2);

for (int y = y1; y <= y2; ++y) {
     for (int x = x1; x <= x2; ++x) {
        Pixel(x,y) = Value;
     }
    }
}

******************************* void ImageBuffer::Threshold (PixelT Thresh)
//                          **********
```

```
//
// DESCRIPTION: This method locates pixels in image that have values
//     above or equal to a specified threshold.  Pixels above or equal to
//     the threshold are set to their maximum allowable value. All others
//     are set to zero.
//
// INPUTS: Thresh - Threshold value
//
//                **********
{
    Threshold (0, 0, ImageWidth-1, ImageHeight-1, Thresh);
} void ImageBuffer::Threshold (int x1, int y1, int x2, int y2, PixelT Thresh)
//                **********
//
// DESCRIPTION: This method locates pixels in a rectangular region that
//     have values above or equal to a specified threshold. Pixels above
//     or equal to the threshold are set to their maximum allowable value.
//     All others are set to zero.
//
// INPUTS: x1, y1 - Co-ordinates of upper-left of region to process
//         x2, y2 - Co-ordinates of lower-right of region to process
//         Thresh - Threshold value
//
//                **********
{
    assert (x1 <= x2 && y1 <= y2);

for (int y = y1; y <= y2; ++y) {
     for (int x = x1; x <= x2; ++x) {
         if (Pixel(x,y) >= Thresh)
           Pixel(x,y) = MaxPixel();
         else
           Pixel(x,y) = 0;
     }
    }
}

******************************* void ImageBuffer::Subtract()
//                **********
//
```

```
// DESCRIPTION: This method subtracts the first field of the image from
//      the second and the second field from the first.  The image is assumed
//      to consist of two separate fields with the even lines (y coord)
//      containing the first field and the odd lines containing the second
//      field.  If a subtraction results in a negative value then that pixel
//      is set to zero.
//
//                  **********
{
    Subtract (0, 0, ImageWidth-1, ImageHeight-1);
} void ImageBuffer::Subtract (int x1, int y1, int x2, int y2)
//                  **********
//
// DESCRIPTION: This method subtracts the first field of the image from
//      the second and the second field from the first.  The image is assumed
//      to consist of two separate fields with the even lines (y coord)
//      containing the first field and the odd lines containing the second
//      field.  If a subtraction results in a negative value then that pixel
//      is set to zero.
//
// INPUTS: x1, y1 - Co-ordinates of upper-left of region to process
//         x2, y2 - Co-ordinates of lower-right of region to process
//
//                  **********
{
    assert (x1 <= x2 && y1 <= y2);
    assert ((y1 % 2 == 0) && (y2 % 2 == 0));   // y1 and y2 must be even PixelT Field1, Field2;

for (int y = y1; y <= y2; y=y+2) {
      for (int x = x1; x <= x2; ++x) {
          Field1 = Pixel(x,y);       // Pixel from first field
          Field2 = Pixel(x,y+1);     // Pixel from second field if (Field1 > Field2)
              Pixel(x,y) = Field1 - Field2;    // Calc the pixel difference
          else
              Pixel(x,y) = 0;        // Set negative values to zero
```

```
            if (Field2 > Field1)
                Pixel(x,y+1) = Field2 - Field1; // Calc the pixel
difference
            else
                Pixel(x,y+1) = 0;   // Set negative values to zero
        }
    }
}

***************************** float ImageBuffer::Average()
//              **********
//
// DESCRIPTION: This method calculates the average value of
all of the
//    pixels contained in the image.
//
// OUTPUTS: Average() - Average value of pixels.
//
//              **********
{
    return Average (0, 0, ImageWidth-1, ImageHeight-1);
} float ImageBuffer::Average (int x1, int y1, int x2, int y2)
//              **********
//
// DESCRIPTION: This method calculates the average value of
all of the
//    pixels contained in the rectangular region specified.
//
// INPUTS:  x1, y1    - Co-ordinates of upper-left of region
to process
//          x2, y2    - Co-ordinates of lower-right of region
to process
//
// OUTPUTS: Average() - Average value of pixels.
//
//              **********
{
    assert (x1 <= x2 && y1 <= y2);

long Total = 0, Count = 0;
    for (int y = y1; y <= y2; ++y) {
     for (int x = x1; x <= x2; ++x) {
        Total = Total + Pixel(x,y);
        ++Count;
     }
    }
```

```
    float Avg = float(Total)/float(Count);
    return Avg;
}

***************************** void ImageBuffer::Flood (int x, int y, PixelT NewValue,
            int& PosX, int& PosY, int& GroupSize)
//              **********
//
// DESCRIPTION: This method locates all of the pixels in the connected
//      group starting at the specified point.  All of the pixels identified
//      are replaced with the value "NewValue".  The centroid of the group
//      and the number of pixels in the group are returned.
//
// INPUTS:  StartX, StartY  - Starting location.
//          NewValue        - Replace pixels in group with this value.
//
// OUTPUTS: PosX, PosY      - Location of "centroid" of group.
//          GroupSize       - Number of pixels in group.
//
//              **********
{
    int Count = 0;
    long SumX = 0;
    long SumY = 0;
    PixelT Target = Pixel(x,y);
    assert (Target != NewValue);

QueueXY Fifo(200);
    Fifo.Push (x,y);

while (!Fifo.Empty()) {
     Fifo.Pop (x,y);

for (int xr = x; xr < ImageWidth; ++xr) {
          if (Pixel(xr,y) == Target) {
            Pixel(xr,y) = NewValue;
            ++Count;
            SumX = SumX + xr;
            SumY = SumY + y;
          }
          else break;
      }
      --xr;

for (int xl = x-1; xl >= 0; --xl) {
          if (Pixel(xl,y) == Target) {
            Pixel(xl,y) = NewValue;
            ++Count;
```

```
            SumX = SumX + x1;
            SumY = SumY + y;
        }
        else break;
    }
    ++x1;

for (x = x1; x <= xr; ++x) {
        if (y-2 >= 0)
          if (Pixel(x,y-2) == Target)
            Fifo.Push (x,y-2);

if (y+2 < ImageHeight)
          if (Pixel(x,y+2) == Target)
            Fifo.Push (x,y+2);
    }
  } assert (Count > 0);
  PosX = int(SumX/Count);
  PosY = int(SumY/Count);
  GroupSize = Count;
}
#include <fstream.h>
#include <alloc.h>
include <assert.h>
#include "param.hpp"

const float DefaultCal = 0.000363;
ParamRecord::ParamRecord (int NoRecords)
//               **********
//
// DESCRIPTION: Constructor for class ParamRecord. Allocates memory fo
//    parameters and initializes to default values.
//
// INPUTS: NoRecord - Number of records to allocate.
//
//               **********
{
    assert (NoRecords > 0);
    RecordSize = NoRecords;
    Status = 0;

CalConst = new float [NoRecords];
    assert (CalConst != NULL);

for (int i = 0; i < NoRecords; ++i)
      CalConst[i] = DefaultCal;
} void ParamRecord::Load (const char* FName)
//               **********
//
```

```
// DESCRIPTION: Loads the parameter values from the specified
file.
//
// INPUTS: FName - Name of parameter file.
//
//              **********
{
    ifstream f(FName);

if (!f)
     Status = -1;
    else {
     for (int i = 0; i < RecordSize; ++i)
        f >> CalConst[i];

Status = 0;
    } f.close();
} void ParamRecord::Save (const char* FName)
//              **********
//
// DESCRIPTION: Save parameter values to specified file.
//
// INPUTS: FName - Name of parameter file.
//
//              **********
{
    ofstream f(FName, ios::out);

if (!f)
     Status = -1;
    else {
     for (int i = 0; i < RecordSize; ++i)
        f << CalConst[i] << "\n";

Status = 0;
    } f.close();
}
#include <alloc.h>
include <assert.h>
#include <math.h>
#include "profile.hpp"

Profile::Profile()
//              **********
//
// DESCRIPTION: Constructor for class Profile.
//
//              **********
{
```

```
    Size = 0;
    LeftEdge = NULL;
    RightEdge = NULL;
}

*****************************

Profile::Profile (int NewSize)
//                 *********
//
// DESCRIPTION: Constructor for class Profile.  Memory is
allocated for two
//    arrays of size NewSize which hold the coordinates of the
left and right
//    edges of the stream.  If there is insufficient memory
for the arrays
//    a run time error will occur.
//
// INPUTS:   NewSize - Number of elements in array
// OUTPUTS: None
//
//                 *********
{
    Size = NewSize;
    LeftEdge = new int [Size];
    RightEdge = new int [Size];
    assert (LeftEdge != NULL && RightEdge != NULL);
}

*****************************

Profile::~Profile()
//                 *********
//
// DESCRIPTION: Destructor for class Profile.  Allocated
memory is deleted
//    and class variables are reset.
//
// INPUTS:   None
// OUTPUTS: None
//
//                 *********
{
    delete LeftEdge;
    delete RightEdge;
    Size = 0;
}

***************************** void Profile::Resize (int NewSize)
//                 *********
//
```

// DESCRIPTION: This method resizes the Profile class.
//
// INPUTS:   NewSize - Number of elements in array
// OUTPUTS: None
//
//                *********
{
    if (NewSize != Size) {
      if (LeftEdge != NULL)
          delete LeftEdge;

if (RightEdge != NULL)
          delete RightEdge;

Size = NewSize;
      LeftEdge = new int [Size];
      RightEdge = new int [Size];

assert (LeftEdge != NULL && RightEdge != NULL);
    }
}

***************************** float Profile::AvgWidth()
//                *********
//
// DESCRIPTION: THis method calculates and returns the average width of
//    the stream over its entire length.
//
// INPUTS:   None
// OUTPUTS: AvgWidth() - Average width of stream (pixels)
//
//                *********
{
    long Sum = 0;

for (int i = 0; i < Size; ++i)
      Sum = Sum + Width(i);

return ((float)Sum/(float)Size);
}

***************************** float Profile::Volume()
//                *********
//
// DESCRIPTION: This method calculates and returns the total volume of the
//    stream.
//

```
// INPUTS:  None
// OUTPUTS: Volume() - Volume of stream (pixels^3)
//
//                    **********
{
    return Volume (0, Size-1);
}

******************************* float Profile::Volume (int y1, int y2)
//                    **********
//
// DESCRIPTION: This method calculates and returns the total volume of the
//    stream between to vertical coordinates.
//
// INPUTS:  y1, y2   - Starting and ending vertical coordinates.
// OUTPUTS: Volume() - Volume of stream between y1 and y2 (pixels^3)
//
//                    **********
{
    float Vol = 0.0;
    float Radius;

assert (y1 <= y2);

for (int i = y1; i <= y2; ++i) {
     Radius = Width(i)/2.0;
     Vol = Vol + M_PI*Radius*Radius;
    } return Vol;
} include <iostream.h>
include <stdlib.h>
#include <stdio.h>
#include <math.h>
#include <graphics.h>
#include "util.hpp"
#include "gfs.hpp"
#include "screen.hpp"

StatusScreen::StatusScreen()
//                    **********
//
// DESCRIPTION: Constructor for class StatusScreen.
//
// INPUTS:  None
// OUTPUTS: None
//
//                    **********
{
```

```
    int GraphDriver = DETECT, GraphMode;
    detectgraph (&GraphDriver, &GraphMode);
    initgraph (&GraphDriver, &GraphMode, "C:\\TC\\BGI");
    int ErrorCode = graphresult();
    if (ErrorCode != grOk) {
     cerr << "Graphics error:" << grapherrormsg(ErrorCode) <<
".\n";
     exit(-1);
    } for (int i = 0; i < 4; ++i) {
     x1[i] = int((0.04 + i*0.24)*getmaxx());
     y1[i] = int(0.05*getmaxy());
     x2[i] = int((0.24 + i*0.24)*getmaxx());
     y2[i] = int(0.25*getmaxy());
     StatX[i] = int((0.05 + i*0.24)*getmaxx());
     StatY[i] = int(0.26*getmaxy());
    } for (i = 0; i < 4; ++i) {
     x1[i+4] = int((0.04 + i*0.24)*getmaxx());
     y1[i+4] = int(0.45*getmaxy());
     x2[i+4] = int((0.24 + i*0.24)*getmaxx());
     y2[i+4] = int(0.65*getmaxy());
     StatX[i+4] = int((0.05 + i*0.24)*getmaxx());
     StatY[i+4] = int(0.66*getmaxy());
    } setbkcolor (BLACK);
    setfillstyle (SOLID_FILL, LIGHTGRAY);
    bar (0, 0, getmaxx(), getmaxy());

for (i = 0; i < 8; ++i)
     Update (i, 0.0, 0.0, 0.0, 0, 0.0, 0.0, 0.0, false,
false);
}

StatusScreen::~StatusScreen()
//          *********
//
// DESCRIPTION: Destructor for class StatusScreen
//
// INPUTS:  None
// OUTPUTS: None
//
//          *********
{
    closegraph();
} void StatusScreen::Update (int i, float FlowRate, float
Width, float Intensity,
                int Align, float Angle, float Focus, float
Std,
                boolean Fault, boolean Sel)
//          *********
```

```
//
// DESCRIPTION: Updates screen with flow rate, etc. for given
camera.
//
// INPUTS:    i          - Camera number
//            FlowRate   - Flow rate in kg/hr
//            Width      - Average width of stream
//            Intensity  - Average intensity of stream
//            Align      - Distance of stream from center of
screen
//            Angle      - Angle of stream from vertical
//            Focus      - Sharpness of focus
//            Std        - S.T.D. of stream profile
//            Fault      - Indicates fault in calculation
//            Sel        - Place a marker beside this camera
// OUTPUTS: None
//
//                   **********
{
    char StrBuffer[80];
    setcolor (LIGHTRED);
    setbkcolor (BLACK);
    setfillstyle (SOLID_FILL, BLACK);
    bar3d (x1[i], y1[i], x2[i], y2[i], 4, 1);

sprintf (StrBuffer, "Bushing #%d", i+3);
    setcolor (BLUE);
    settextjustify (CENTER_TEXT, BOTTOM_TEXT);
    outtextxy ((x1[i]+x2[i])/2, y1[i] - 5, StrBuffer);

int PWidth = int((Width/512.0)*(x2[i] - x1[i]));
    int PAlign = int(((Align+256)/512.0)*(x2[i] - x1[i]));

if (Intensity >= MinIntens) {
      setfillstyle (SOLID_FILL, YELLOW);
      bar (x1[i] + PAlign - PWidth/2, y1[i]+1,
           x1[i] + PAlign + PWidth/2, y2[i]-1);
    } setfillstyle (SOLID_FILL, LIGHTGRAY);
    bar (x1[i], y2[i]+1, x2[i], y2[i] + 75);

settextjustify (LEFT_TEXT, TOP_TEXT);
    sprintf (StrBuffer, "Pull : %5.1f %c", FlowRate,
Sel?'*':' ');
    setcolor (!Fault ? LIGHTBLUE : RED);
    outtextxy (StatX[i], StatY[i], StrBuffer);

sprintf (StrBuffer, "Width : %5.1f", Width);
    setcolor ((Width >= MinWidth && Width <= MaxWidth) ?
LIGHTBLUE : RED);
    outtextxy (StatX[i], StatY[i]+10, StrBuffer);

sprintf (StrBuffer, "Intes : %5.1f", Intensity);
    setcolor ((Intensity >= MinIntens) ? LIGHTBLUE : RED);
    outtextxy (StatX[i], StatY[i]+20, StrBuffer);
```

```c
        sprintf (StrBuffer, "Align : %5d", Align);
        setcolor ((abs(Align) <= MaxAlign) ? LIGHTBLUE : RED);
        outtextxy (StatX[i], StatY[i]+30, StrBuffer);

sprintf (StrBuffer, "Angle : %5.1f", Angle);
        setcolor (LIGHTBLUE);
        outtextxy (StatX[i], StatY[i]+40, StrBuffer);

sprintf (StrBuffer, "Focus : %5.2f", Focus);
        setcolor ((Focus >= MinFocus) ? LIGHTBLUE : RED);
        outtextxy (StatX[i], StatY[i]+50, StrBuffer);

sprintf (StrBuffer, "STD   : %5.1f", Std);
        setcolor ((Std <= MaxStd) ? LIGHTBLUE : RED);
        outtextxy (StatX[i], StatY[i]+60, StrBuffer);
}
#ifndef __BUBBLE_HPP
define __BUBBLE_HPP class Bubble {
    private:
        int x, y;          // Coordinates of bubble
        int BubbleSize;    // Size of bubble in pixels public:
        Bubble() {x = 0; y = 0; BubbleSize = 0;}
        Bubble (int NewX, int NewY, int NewSize)
            {x = NewX; y = NewY; BubbleSize = NewSize;}
        ~Bubble() {}
        int GetX() {return x;}
        int GetY() {return y;}
        int Size() {return BubbleSize;}
};
class BubbleList {
    private:
        Bubble* Bubbles;   // Array of bubbles
        int MaxSize;       // Maximum size of list
        int CurrSize;      // Current size of list
        int Index;         // Current index into list public:
        BubbleList (int NewSize);
        ~BubbleList() {delete Bubbles;}
        void Add (Bubble NewBubble);   // Add a new bubble to
the list
        int ListSize() {return CurrSize;}
        void Reset() {CurrSize = 0;}
        Bubble* First();   // Return reference to first bubble
in list
        Bubble* Next();    // Return reference to next bubble
in list
};

#endif
#ifndef __DT2814_HPP
#define __DT2814_HPP
```

```
class dt2814 {
    private:
      int BaseAddr;
      float LowRange[16];
      float HighRange[16];
      int Status;

public:
      dt2814 (int NewBaseAddr = 0x0220);
      ~dt2814() {}
      void Scale (int Channel, float LowR, float HighR);
      float Input (int Channel);
      int GetStatus() {return Status;}
};

#endif
#ifndef __DT2815_HPP
define __DT2815_HPP class dt2815 {
    private:
      int BaseAddr;
      int Program;
      int ChannelCount;
      int ModeSelect;
      float LowRange[8];
      float HighRange[8];
      int Status;

public:
      dt2815 (int Prog = 2, int Channels = 7, int Mode = 1,
int Base = 0x0224);
      ~dt2815() {}
      void Scale (int Channel, float LowR, float HighR);
      void Output (int Channel, float Data);
      int GetStatus() {return Status;}
};

#endif
#ifndef __DT2859_HPP
define __DT2859_HPP include <assert.h>
include <dos.h> class dt2859 {
    private:
      int  BaseAddr;

public:
      dt2859 (int  NewBaseAddr = 0x02E3) {BaseAddr =
NewBaseAddr;}
      ~dt2859() {}
      void Select (int Camera) {assert (Camera >= 0 &&
Camera < 8);
                     outportb (BaseAddr, Camera);}
};
```

```cpp
#endif
#ifndef __FILTER_HPP
define __FILTER_HPP class MedianFilter {
    private:
        float *Table;
        int MaxSize;
        int Size;

public:
        MedianFilter();
        MedianFilter (int NewMaxSize);
        ~MedianFilter() {delete Table;}
        void Reset() {Size = 0;}
        void Resize (int NewMaxSize);
        float Add (float Data);
        int CurrSize() {return Size;}
};

#endif
#ifndef __GFLOW_HPP
define __GFLOW_HPP const float MinIntens = 100.0;      // Minimum acceptable intensity
const int   MaxAlign  = 100;        // Maximum acceptable alignment error
const float MinFocus  = 0.10;       // Minimum acceptable focus
const float MaxStd    = 2.5;        // Maximum acceptable STD
const float MinWidth  = 30.0;
const float MaxWidth  = 80.0;

endif ifndef __HRT512_HPP
define __HRT512_HPP include "image.hpp"
include "util.hpp"

class Hrt512 {
    private:
        byte*  BaseAddr;
        byte*  CtrlReg;
        byte*  CrtcAddr;
        byte*  CrtcData;
        byte*  CrtcStat;
        word*  YReg;
        byte*  PalAddr;
        int    Status;

public:
        Hrt512 (unsigned BaseSeg = 0xD400);
        ~Hrt512() {}
        void LiveVideo();
```

```
        void FreezeVideo();
        void NextStill();
        void ReadImage (ImageBuffer& Image, int StartX = 0, int
StartY = 0);
        void ShowImage (ImageBuffer& Image, int StartX = 0, int
StartY = 0);
        void Retrace (int n = 1);
        int  MaxWidth() {return 512;}
        int  MaxHeight() {return 512;}
        byte MaxPixel() {return 255;}
        int  GetStatus() {return Status;}
};

#endif
#ifndef __IMAGE_HPP
define __IMAGE_HPP include <assert.h> typedef unsigned char PixelT;

class ImageBuffer {
    private:
        PixelT** Buffer;
        int ImageWidth;
        int ImageHeight;

public:
        ImageBuffer();
        ImageBuffer (int Width, int Height);
        ~ImageBuffer();
        void Resize (int Width, int Height);
        int Width() {return ImageWidth;}
        int Height() {return ImageHeight;}
        PixelT MaxPixel() {return 255;}
        PixelT& Pixel (int x, int y) {assert (x >= 0 && x <
ImageWidth);
                          assert (y >= 0 && y < ImageHeight);
                          return Buffer[y][x];}
        void Fill (PixelT Value);
        void Fill (int x1, int y1, int x2, int y2, PixelT
Value);
        void Flood (int x, int y, PixelT NewValue,
              int& PosX, int& PosY, int& GroupSize);
        void Threshold (PixelT Thresh);
        void Threshold (int x1, int y1, int x2, int y2, PixelT
Thresh);
        void Subtract();
        void Subtract (int x1, int y1, int x2, int y2);
        float Average();
        float Average (int x1, int y1, int x2, int y2);
};

#endif
#ifndef __PARAM_HPP
#define __PARAM_HPP
```

```
include <assert.h> class ParamRecord {
    private:
       int   RecordSize;
       int   Status;
       float*  CalConst;

public:
       ParamRecord (int NoRecords);
       ~ParamRecord() {delete CalConst;}
       float& Cal(int i) {assert (i >= 0 && i < RecordSize);
                return CalConst[i];}
       void Load (const char* FName);
       void Save (const char* FName);
       int GetStatus() {return Status;}
};

#endif
#ifndef __PROFILE_HPP
define __PROFILE_HPP include <assert.h> class Profile {
    private:
       int *LeftEdge;     // Left edge of stream
       int *RightEdge;    // Right edge of stream
       int Size;          // Number of elements in Profile
array public:
       Profile();
       Profile (int NewSize);
       ~Profile();
       void Resize (int NewSize);
       int&  Left (int n) {assert (n >= 0 && n < Size);
                return LeftEdge[n];}
       int&  Right (int n) {assert (n >= 0 && n < Size);
                return RightEdge[n];}
       int  Width (int n) {assert (n >= 0 && n < Size);
                return (RightEdge[n] - LeftEdge[n] + 1);}
       float   AvgWidth();
       float   Volume();
       float   Volume (int y1, int y2);
};

#endif
#ifndef __QUEUE_HPP
define __QUEUE_HPP include <alloc.h>
include <assert.h>
#include "util.hpp"
```

```cpp
class QueueXY {
    private:
       int* Qx;
       int* Qy;
       int Head;
       int Tail;
       int QSize;
       int MaxQSize;

public:
       QueueXY (int MaxSize) {Qx = new int[MaxSize];
                   Qy = new int[MaxSize];
                   assert (Qx != NULL && Qy != NULL);
                   Head = 0; Tail = 0;
                   QSize = 0; MaxQSize = MaxSize;}

~QueueXY() {delete Qx; delete Qy;}
       void Push (int x, int y) {if (QSize < MaxQSize - 1) {
                   Qx[Head] = x;
                   Qy[Head] = y;
                   Head = (Head + 1) % MaxQSize;
                   ++QSize;}
                 } void Pop (int& x, int &y) {assert (QSize != 0);
                   x = Qx[Tail];
                   y = Qy[Tail];
                   Tail = (Tail + 1) % MaxQSize;
                   --QSize;} boolean Empty() {return boolean(QSize == 0);}
};

#endif
#ifndef __SCREEN_HPP
define __SCREEN_HPP include "util.hpp"

const MaxStat = 8;

class StatusScreen {
    private:
       int x1 [MaxStat];
       int y1 [MaxStat];
       int x2 [MaxStat];
       int y2 [MaxStat];
       int StatX [MaxStat];
       int StatY [MaxStat];

public:
       StatusScreen();
       ~StatusScreen();
       void Update (int i, float FlowRate, float Width, float Intensity,
               int Align, float Angle, float Focus, float Std,
               boolean Fault, boolean Sel);
```

```
};

#endif
#ifndef __UTIL_HPP
define __UTIL_HPP include <time.h>
enum boolean {false=0, true=1};
typedef unsigned char byte;
typedef unsigned int word;

inline int min (int a, int b)
{
    if (a < b)
     return (a);
    else
     return (b);
} inline int max (int a, int b)
{
    if (a > b)
     return (a);
    else
     return (b);
} inline void swap (float& a, float& b)
{
    float temp = a;
    a = b;
    b = temp;
} class StopWatch {
    private:
        clock_t  LastReset;

public:
        StopWatch() {LastReset = clock();}
        ~StopWatch() {}
        void Reset() {LastReset = clock();}
        float Elapsed() {return ((clock() -
LastReset)/CLK_TCK);}
};

#endif
```

We claim:

1. A method of determining the flow rate of a viscious fluid stream, comprising passing the fluid stream through a field of view of an electronic imaging means, said imaging means producing output signals representing images of said fluid stream at successive times $t_0, t_1 \ldots t_n$, storing in first memory means said signals representing an image of said fluid stream at a first time $t_i$, storing in second memory means said signals representing an image of said fluid stream at a second time $t_j$, the interval $t_j - t_i$ being chosen so that said interval is less than the time taken for a point on said fluid stream to cross a field of view of said imaging means, analyzing said stored signals to derive width signals W(y) representing the width of said fluid stream as a function of y, where y represents a coordinate in the direction of fluid flow, comparing said first and second stored signals to identify a common point on said fluid stream in the respective images represented thereby, deriving signals representing at least the y coordinates $y_1, y_2$ of said common point in the respective images, and deriving a signal representing the flow rate of said fluid stream from said width signals $W_{(y)}$ and said signals representing at least the y coordinates $y_1$, $y_2$ of said common point in the respective images;

said output signals produced by said imaging means being digitized and stored at discrete addresses in said respective first and second memory means, the digitized signal stored at each address representing the intensity of the image at a corresponding pixel in the image;

and wherein the signals representing said stored images are first scanned line by line to identify the edges of the fluid stream defined by changes in intensity exceeding a predetermined threshold, thereby permitting the width of said fluid stream to be determined for each line;

said stored images being also scanned line by line to identify groups of adjacent pixels having values above a predetermined threshold, said groups being assumed to represent bubbles in the fluid stream, and the pixels of said identified groups are all set to predetermined values designating them as parts of bubbles.

2. A method as claimed in claim 1, wherein the signals representing said stored images are compared to match the bubbles identified therein, and the y coordinates of the matched bubbles between the images is determined from the pixel locations of a matched bubble in the first image and the second image.

3. A method as claimed in claim 2, wherein the bubbles are matched by determining the X and Y coordinates of all the bubbles in said images, comparing all the pairs of bubbles, and identifying bubbles as a matched pair if a) the difference in their X coordinates is less than a first predetermined value determined by the allowable lateral movement of a bubble in the fluid stream, b), the difference in their Y coordinates lies within predetermined limits defined by the minimum and maximum distance travelled by a point on the fluid stream at the minimum and maximum possible flow speeds, and c) the ratio of the two bubble sizes lies between predetermined limits.

4. A method as claimed in claim 3, wherein said first predetermined value is about 10, the difference in the predetermined limits of the Y coordinates lies between 320 and 380, pixels the ratio of the two bubble sizes is not less than about 0.5 and not more than about 2.0.

5. A method as claimed in claim 4, wherein the flow rate is calculated from the width of the fluid stream $W(y)$ and the y coordinates $y_1$, $y_2$ of a matched bubble is determined in accordance with the expression:

$$\text{Flow} = \frac{K \cdot G_{dens}}{(T_2 - T_1)} \sum_{y=y_1}^{y_2} \frac{\Pi}{4} (\text{Width}(y))^2.$$

6. A method as claimed in claim 5, wherein when no matching bubble pairs are located in said images, a signal representing an updated flow rate is derived from the last determined flow rate and the square of the ratio of the average width of the fluid stream during the measurement and the average width of the fluid stream during the last measurement.

7. A method as claimed in claim 1, wherein said imaging means comprises a video camera.

8. A method as claimed in claim 7, wherein said imaging means comprises a CCD (charge coupled device) video camera.

9. A method as claimed in claim 1 which is used in the production of glass filaments wherein the signal representing the volumetric flow rate is used to control a forming bushing through which a molten glass stream is drawn.

10. An apparatus for determining the flow rate of a viscous fluid stream comprising an electronic imaging means having a field of view through which the fluid stream passes, said imaging means producing output signals representing images of said fluid stream at successive time intervals $t_0, t_1, \ldots t_n$, first memory means for storing said signals representing an image of said fluid stream at a first time $t_i$, second memory means for storing said signals representing an image of said fluid stream at a second time $t_j$, the intervals $t_j - t_i$ being chosen so that said interval is less than the time taken for a point on said fluid stream to cross a field of view of said imaging means, means for analyzing said stored signals to identify the edges of said fluid stream and derive signals $W(y)$ representing the width thereof as a function of y, where y represents a coordinate in the direction of fluid flow, means for analyzing said stored signals to identify a common point on said fluid stream in said respective images and derive signals representing at least the y coordinates $y_1$, $y_2$ of said common point in the respective images, processing means for deriving a signal representing the volumetric flow rate of said fluid stream from said width signals $W(y)$ and said signals representing at least the y coordinates $y_1$, $y_2$ of said common point in the respective images;

and further comprising means for digitizing the output signals produced by said imaging means, said first and second memory means having a plurality of addresses at which said digitized signals are stored, each said stored digitized signal representing a corresponding pixel in the image;

wherein said means for analyzing said stored signals to identify the edges of said fluid stream scan the stored signals line by line to identify the edges of the fluid stream, said edges being defined by changes in intensity exceeding a predetermined threshold, and thereby determine the width of said fluid stream from the number of pixels between said edges;

and wherein said means for analyzing said stored signals to identify a common point on said fluid stream scan said stored signals to identify groups of adjacent pixels having values above a set threshold, said analyzing means thereby changing the values of the signals in the associated addresses to predetermined values, said predetermined values identifying the pixels represented thereby as parts of bubbles.

11. An apparatus as claimed in claim 10, comprising comparator means to compare the bubbles identified in said stored images to match up said bubbles, and the distance travelled by the matched bubbles between the images being determined from the number of pixels between the location of a matched bubble in the first image and its location in the second image.

12. An apparatus as claimed in claim 11 wherein said comparator means matches the bubbles by determining the X and Y coordinates of all the bubbles in said images, comparing all pairs of bubbles, and identifying bubbles as a matched pair if a) the difference in their X coordinates is less than a first predetermined value determined by the allowable lateral movement of a bubble in the fluid stream, b) the difference in their Y coordinates lies within predetermined limits defined by the minimum and maximum distance travelled by a point on the fluid stream and the minimum and maximum possible flow speeds, and c) the ratio of the two bubble sizes lies between predetermined limits.

13. An apparatus as claimed in claim 12 wherein said first predetermined value is about 10, the difference in the predetermined limits of the Y coordinates lies between 320 and 380 pixels, the ratio of the two bubble sizes is not less than about 0.5 and not more than about 2.0.

14. An apparatus as claimed in claim 13 wherein the flow rate is calculated from the width of the fluid stream and the distance travelled by a matched bubble in accordance with the expression:

$$\text{Flow} = \frac{K \cdot G_{dens}}{(T_2 - T_1)} \sum_{y=y^1}^{y^2} \frac{\Pi}{4} (\text{Width}(y))^2.$$

15. An apparatus as claimed in claim 14, further comprising means for deriving a signal representing an updated flow rate is derived from the last determined flow rate and the square of the ratio of the average width of the fluid stream during the measurement and the average width of the fluid stream during the last measurement when no matching bubble pairs are located in said images.

16. An apparatus as claimed in claim 10 which is used in the production of glass filaments, further comprising means for controlling a forming bushing through which a molten glass stream is drawn in response to the signal representing the volumetric flow rate and a signal representing a desired setpoint.

17. A method of determining the flow rate of a viscous fluid stream, comprising passing the fluid stream through a field of view of a video camera which is programmed to scan the image of the fluid stream in successive first and second fields, with the first field comprising even numbered scan lines and the second field comprising odd numbered scan lines, said camera having a shutter programmed to operate once per field, stored in first memory means signals from a first field representing images of the fluid stream at time $t_i$ and storing in second memory means signals from a second field immediately succeeding said first field and representing images of the fluid stream at time $t_j$, the interval $t_i - t_j$ being chosen so that said interval is less than the time taken for a point on the fluid stream to cross a field of view of said video camera; scanning said stored signals line to line to derive width signals W(y) representing the width of said fluid stream as a function of y for each line, where y represents a coordinate in the direction of fluid flow, comparing said first and second stored signals to identify a common point on said fluid stream in the respective images represented thereby, deriving signals representing at least the y coordinates $y_1$, $y_2$ of said common point in the respective images, and deriving a signal representing the flow rate of said fluid stream from said width signals W(y) and said signals representing at least the y coordinates $y_1$, $y_2$ of said common point in the respective images.

* * * * *

UNITED STATES PATENT AND TRADEMARK OFFICE
CERTIFICATE OF CORRECTION

PATENT NO. : 5,170,438
DATED : December 8, 1992
INVENTOR(S) : Steven J. ANGER; William J. DEVONSHIRE It is certified that error appears in the above-indentified patent and that said Letters Patent is hereby corrected as shown below:

In column 3, line 1, "mess" should be -- mass --.

In claim 1, column 107, line 61, "viscious" should be -- viscous --.

In claim 1, column 107, line 65, "$t_O$, $t_1$" should be -- $t_0$, $t_1$ --, as the subscripts are numerals.

In claim 1, column 109, line 3, "W(y)" should be -- $W_{(y)}$ --.

In claim 4, column 109, line 47, "380, pixels" should be -- 380 pixels --.

In claim 10, column 110, line 11, "$t_O$, $t_1$" should be -- $t_0$, $t_1$ --, as the subscripts are numerals.

In claim 17, column 112, line 13, "stored" should be -- storing --.

Signed and Sealed this

Twenty-fourth Day of September, 1996

Attest:

BRUCE LEHMAN

*Attesting Officer*   *Commissioner of Patents and Trademarks*